United States Patent
Hui et al.

(10) Patent No.: US 9,955,456 B2
(45) Date of Patent: Apr. 24, 2018

(54) NETWORK DISCOVERY IN LOW-POWER AND LOSSY NETWORKS

(71) Applicant: Cisco Technology, Inc., San Jose, CA (US)

(72) Inventors: Jonathan Hui, Belmont, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 256 days.

(21) Appl. No.: 14/551,252

(22) Filed: Nov. 24, 2014

(65) Prior Publication Data
US 2016/0150501 A1 May 26, 2016

(51) Int. Cl.
*H04W 72/00* (2009.01)
*H04B 1/7156* (2011.01)
(Continued)

(52) U.S. Cl.
CPC ........ *H04W 72/005* (2013.01); *H04B 1/7156* (2013.01); *H04W 4/06* (2013.01); *H04W 68/005* (2013.01); *H04W 76/002* (2013.01); *H04B 2001/71563* (2013.01); *H04B 2201/71338* (2013.01); *H04W 72/1205* (2013.01); *Y02B 60/50* (2013.01)

(58) Field of Classification Search
CPC ............. H04W 72/005; H04W 68/005; H04W 76/002; H04W 4/06; H04W 72/1205; H04W 76/002; H04B 1/7156; H04B 2001/71563; H04B 2201/71338; Y02B 60/50
See application file for complete search history.

(56) References Cited

U.S. PATENT DOCUMENTS 8,385,384 B1 * 2/2013 Kidder ................ H04W 4/06
375/133
9,020,008 B2 4/2015 Hui et al.
(Continued)

OTHER PUBLICATIONS

Gnawali et al., "The Minimum Rank with Hysteresis Objective Function", Request for Comments 6719, Sep. 2012, 13 pages, Internet Engineering Task Force Trust.
(Continued)

*Primary Examiner* — Kwang B Yao
*Assistant Examiner* — Moo Ryong Jeong
(74) *Attorney, Agent, or Firm* — Parker Ibrahim & Berg LLP; James M. Behmke; Stephen D. LeBarron

(57) ABSTRACT

In one embodiment, a device in a network determines a first channel hopping schedule for the device to receive unicast communications from one or more neighbors of the device. The first channel hopping schedule differs from channel hopping schedules used by the one or more neighbors to receive unicast communications. The device determines a second channel hopping schedule for the device that includes a common channel that is common to the device and the one or more neighbors at any given point in time, wherein the second channel hopping schedule is self-generated by each of the device and the one or more neighbors. The device switches from the first channel hopping schedule to the second channel hopping schedule, in response to a network event. The device causes a particular neighbor to join the network using the second channel hopping schedule.

23 Claims, 25 Drawing Sheets

(51) Int. Cl.
  *H04W 4/06*   (2009.01)
  *H04W 68/00*  (2009.01)
  *H04W 76/00*  (2009.01)
  *H04W 72/12*  (2009.01)

(56) References Cited

U.S. PATENT DOCUMENTS

| | | |
|---|---|---|
| 2004/0013166 A1 | 1/2004 | Goodings |
| 2013/0028295 A1 | 1/2013 | Hui et al. |
| 2013/0094536 A1 | 4/2013 | Hui et al. |
| 2014/0126503 A1* | 5/2014 | Kim ................. H04W 16/14 370/329 |
| 2014/0126610 A1 | 5/2014 | Hui et al. |

OTHER PUBLICATIONS

Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Winter et al., "RPL: IPv6 Routing Protocol for Low-Power and Lossy Networks", Request for Comments 6550, Mar. 2012, 157 pages, Internet Engineering Task Force Trust.
International Search Report and Written Opinion dated Feb. 3, 2016 in connection with PCT/US2015/060973.

\* cited by examiner

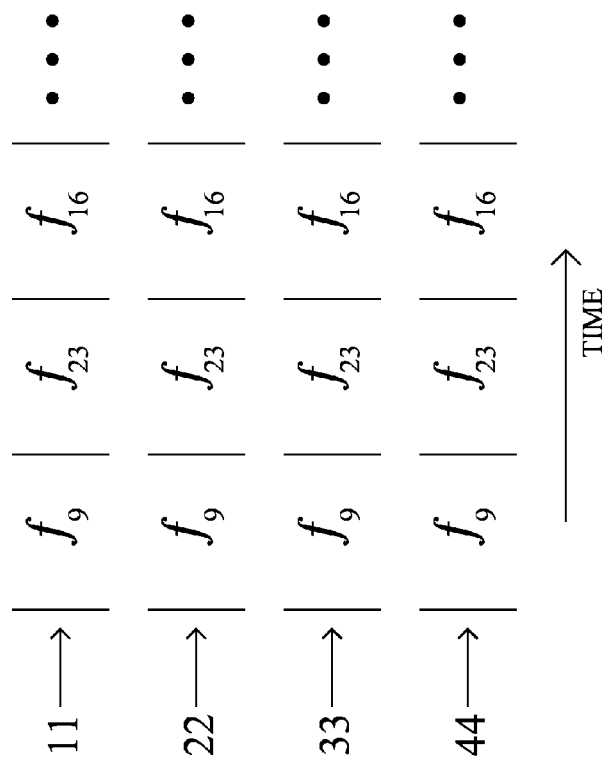

NETWORK DISCOVERY IN LOW-POWER AND LOSSY NETWORKS

TECHNICAL FIELD

The present disclosure relates generally to computer networks, and, more particularly, to network discovery techniques for Low-Power and Lossy Networks.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Gas and water meters are common components of a Smart Grid Advanced Metering Infrastructure (AMI) network, but are also typically more limited in resources than their counterpart electric meters. In particular, gas and water meters are often battery powered, in contrast to electric meters that may be powered by the electric utility. The expected battery life of a meter is often twenty years or more, since a single service call can often exceed the cost of the meter itself. Due to the long lifetime requirement, nearly all gas and water meters use lithium thionly chloride (Li-SOCl2) batteries due to their low self-discharge behavior. However, these batteries are also typically expensive, meaning that many gas and water meters have limited energy resources, which places significant constraints on the operation of a meter. For example, smart gas and water meters typically do not support routing or forwarding packets generated by other devices.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-E illustrate an example of a channel hopping sequence that uses a common channel.

DESCRIPTION OF EXAMPLE EMBODIMENTS

Overview

Figure 1:
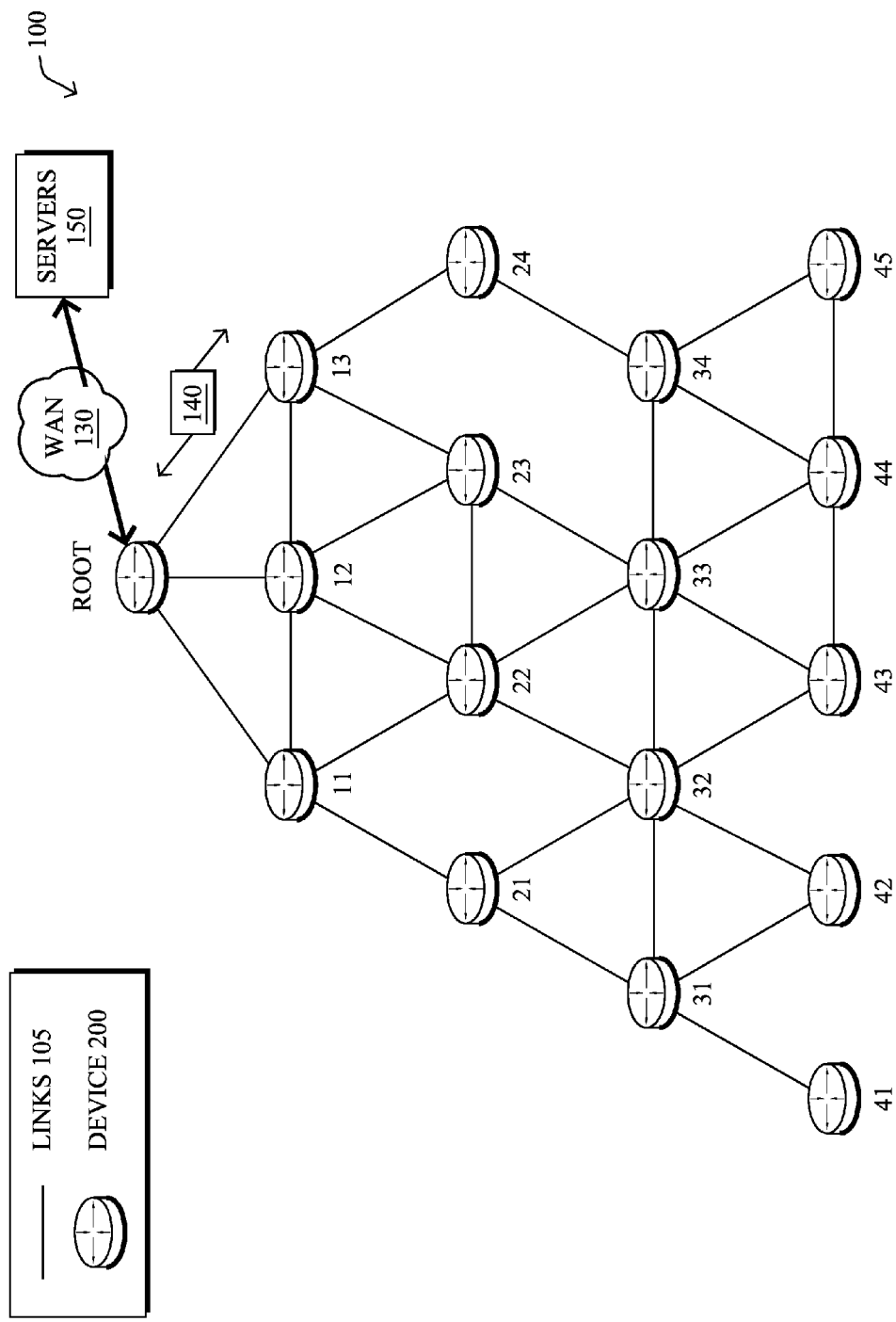
FIG. 1 illustrates an example communication network.

According to one or more embodiments of the disclosure, a device in a network determines a first channel hopping schedule for the device to receive unicast communications from one or more neighbors of the device. The first channel hopping schedule differs from channel hopping schedules used by the one or more neighbors to receive unicast communications. The device determines a second channel hopping schedule for the device that includes a common channel that is common to the device and the one or more neighbors at any given point in time, wherein the second channel hopping schedule is self-generated by each of the device and the one or more neighbors. The device switches from the first channel hopping schedule to the second channel hopping schedule, in response to a network event. The device causes a particular neighbor to join the network using the second channel hopping schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
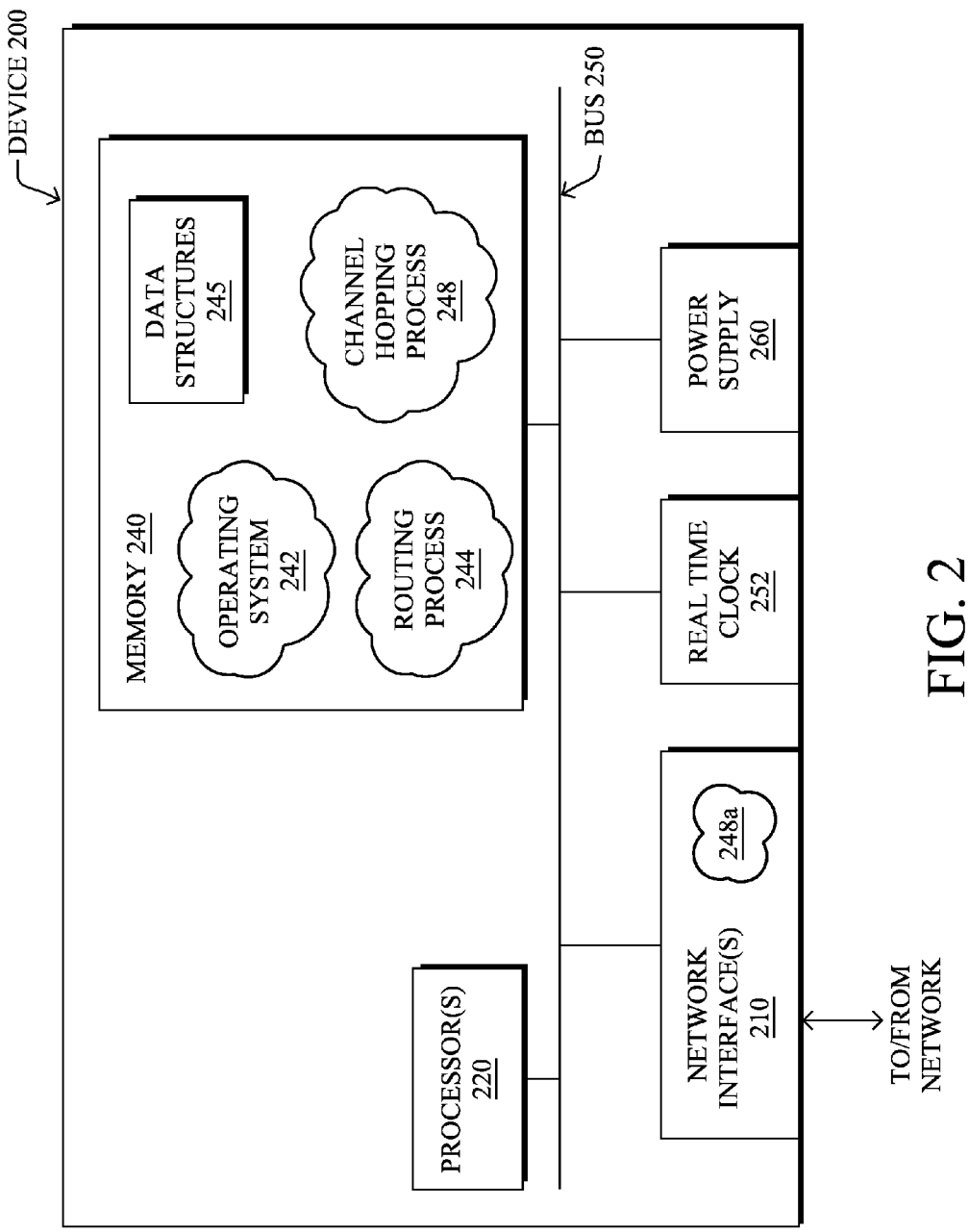
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), a real time clock 252, at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

Real time clock 252 may be a hardware-based circuit (e.g., an integrated circuit, etc.) configured to maintain the current time in the real world. For example, real time clock 252 may be operable to use a twelve hour or twenty four hour time scale, to track the current time. As would be appreciated, the timing mechanisms of real time clock 252 may differ from any internal clocks or oscillators resident in processor 220.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative channel hopping process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low-Power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. For example, a field area router (FAR) may operate as a root node for any number of other LLN devices. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
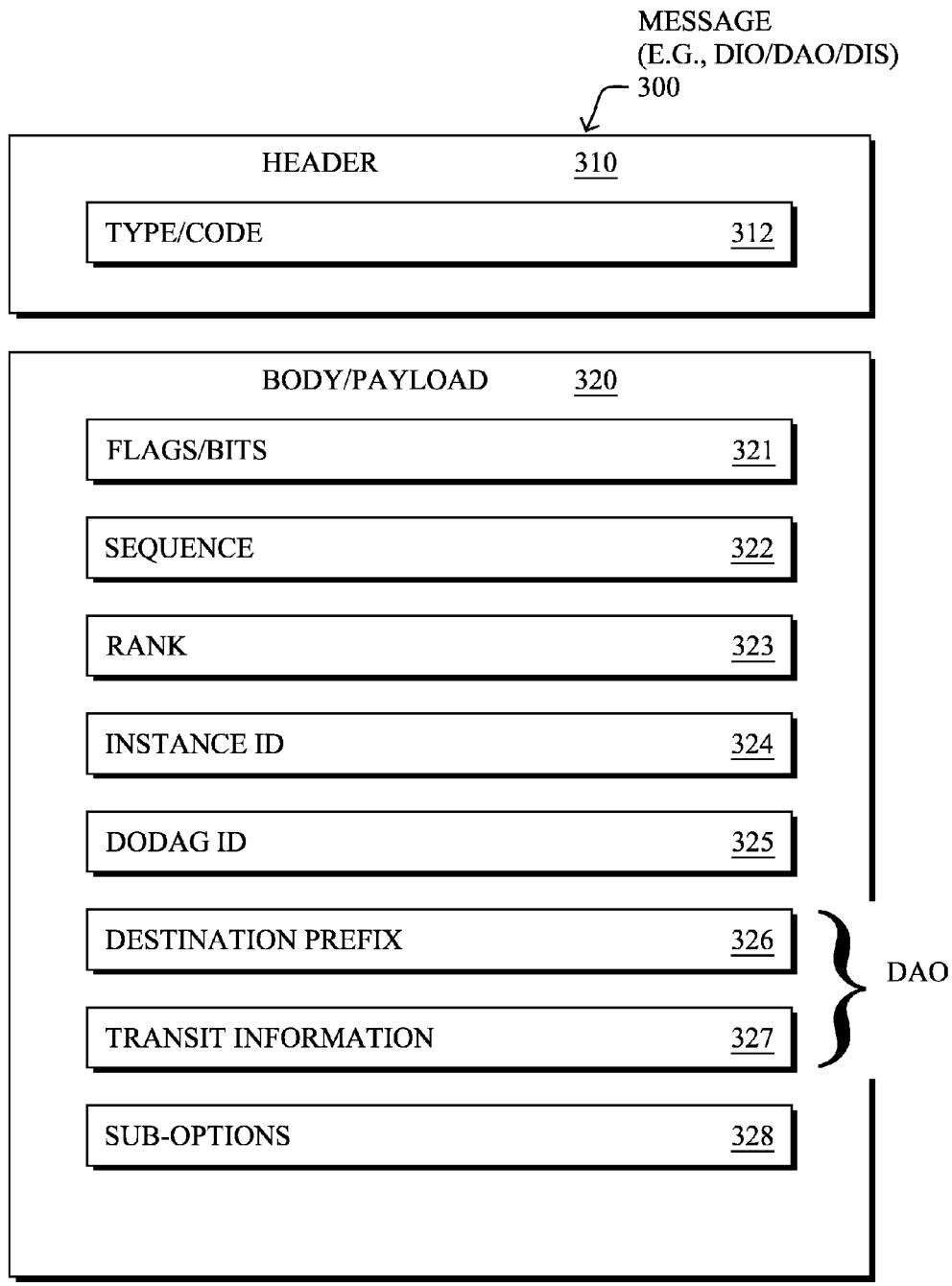
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
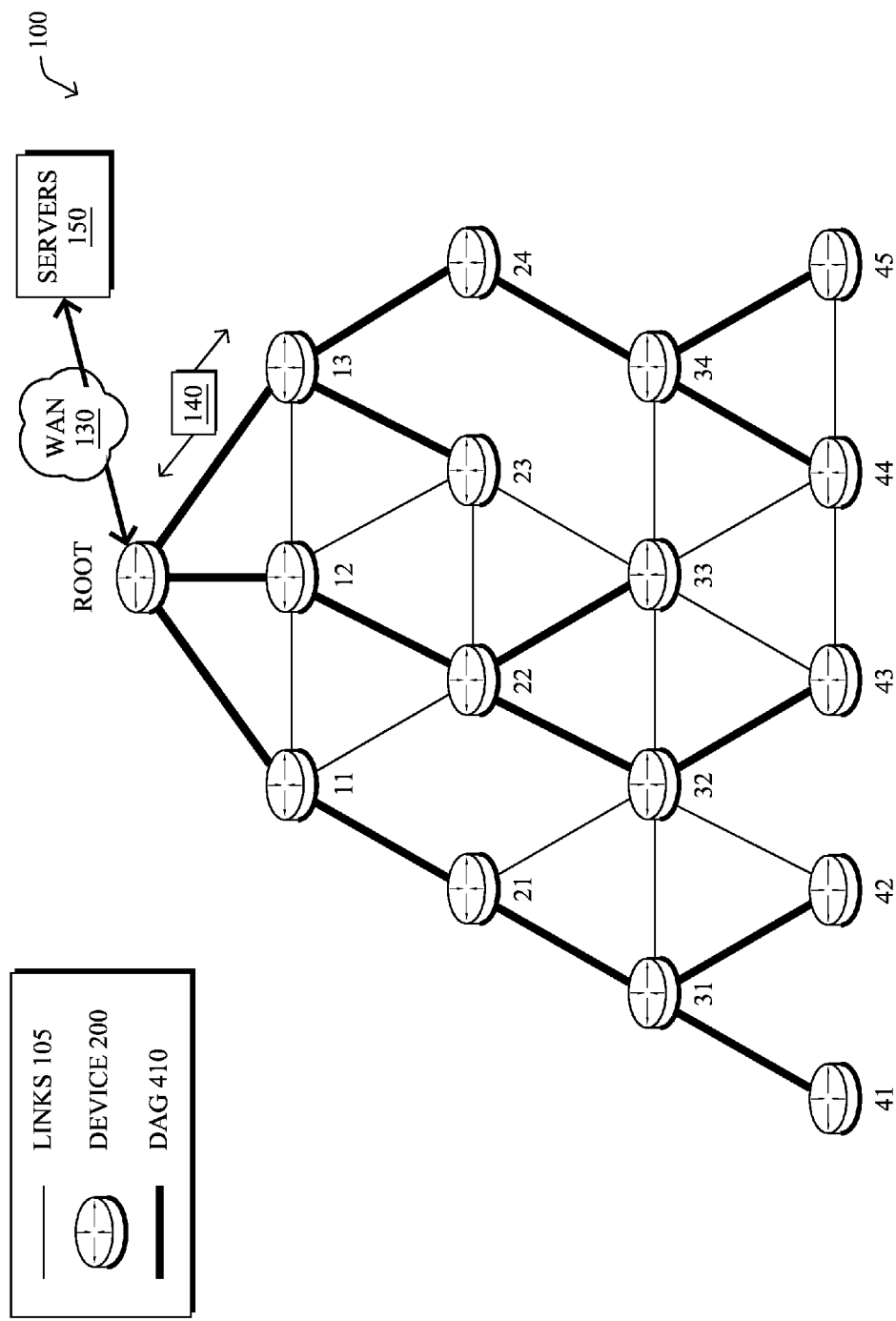
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Moreover, in many cases, LLN devices communicate using a frequency-hopping, or channel-hopping, link layer (the terms "frequency" and "channel" may be used interchangeably herein). This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 5:
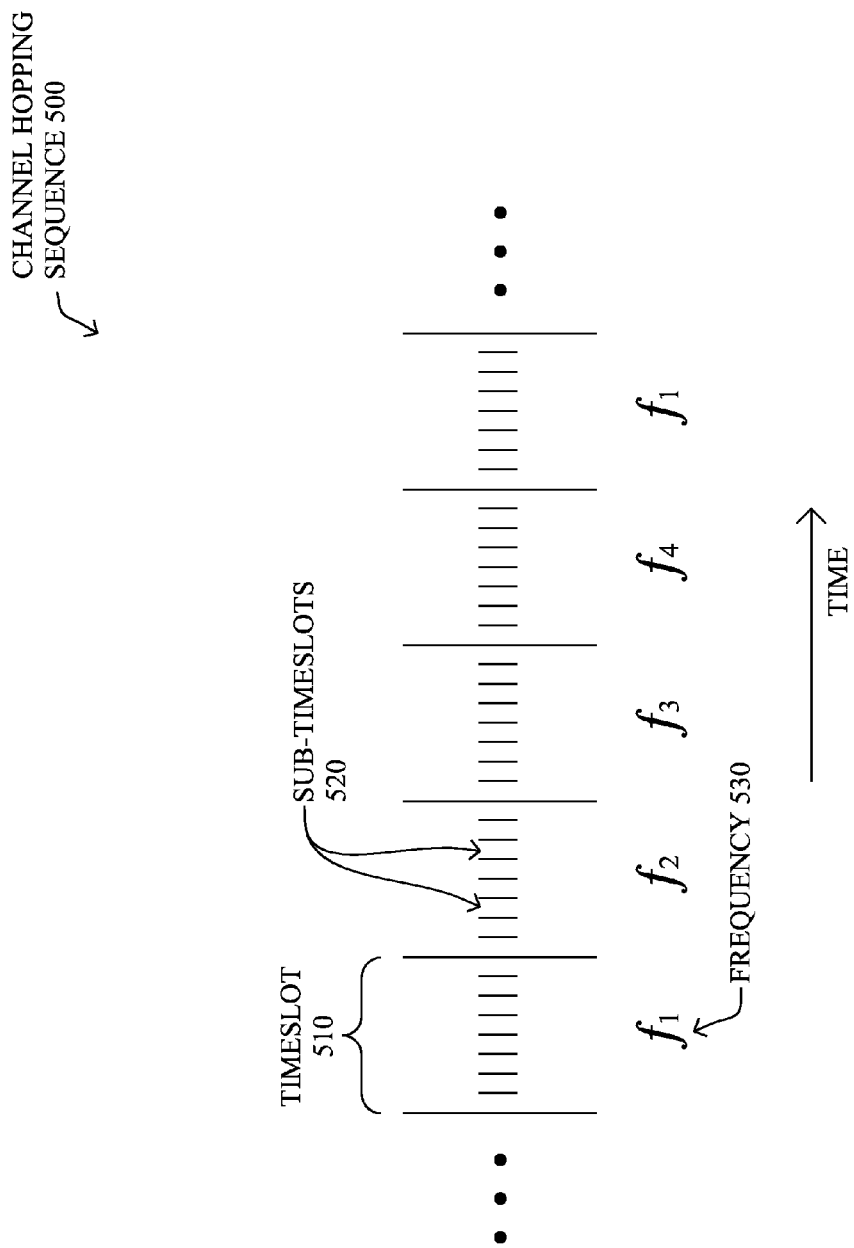
FIG. 5 illustrates an example channel-hopping sequence.

In general, as shown in FIG. 5, in frequency-hopping wireless networks, time frames are divided within a frequency-hopping schedule/sequence 500 into regular timeslots 510, each one operating on a different frequency 530 (e.g., $f_1$-$f_4$). A reference clock may be provided for the time frames for an entire network (e.g., mesh/cell), or at least between pairs of communicating devices. A MAC layer (of network interface 210) of each node 200 divides time into timeslots that are aligned with the timeslot boundary of its neighbor. Also, each timeslot 510 may be further divided into sub-timeslots 520. (Note that not all frequency-hopping systems use sub-timeslots, and devices can begin transmission at any time within a timeslot; the view herein is merely one example.) Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 6A:
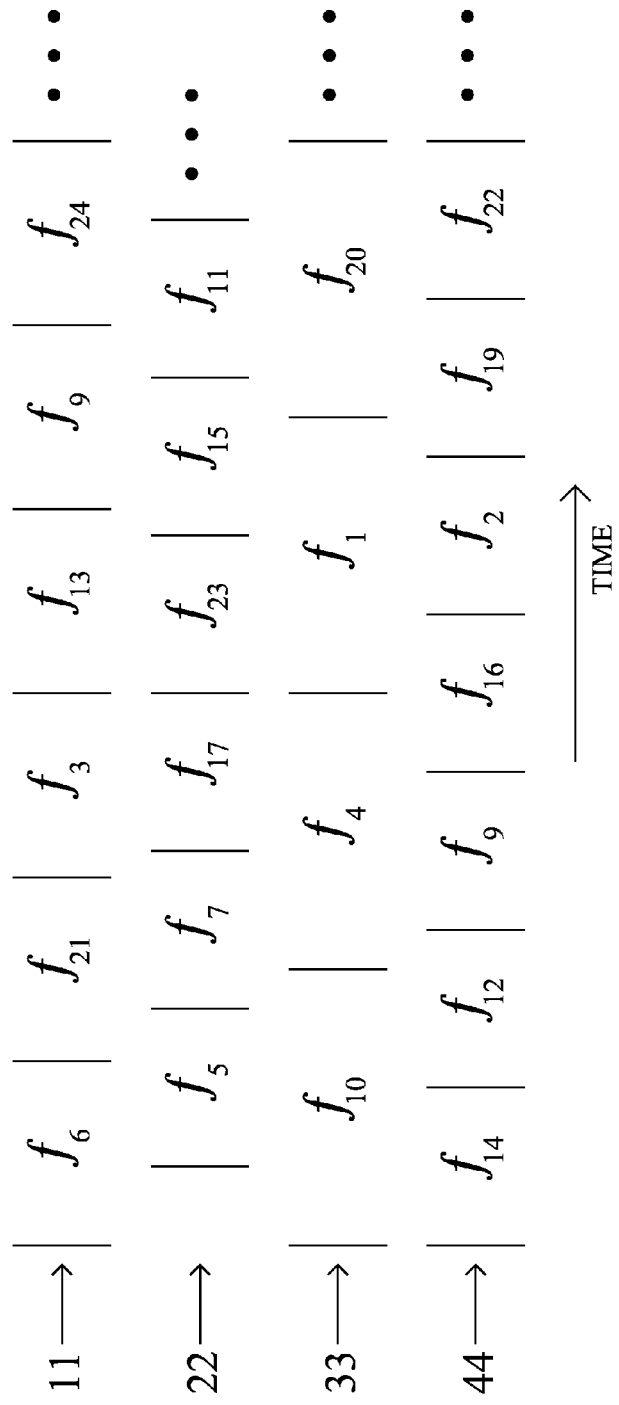
FIGS. 6A-6D illustrate an example of independently determined and independently timed channel-hopping sequences.

FIGS. 6A-6D illustrate an example of independently determined and independently timed channel-hopping sequences, according to various embodiments. As shown in FIG. 6A, each individual device in network 100 (e.g., devices "11," "22," "33," "44," etc.) may independently compute local unicast listening schedules 600, respectively. By having each device determine their own schedule independently, neighboring transmitter-receiver pairs can communicate simultaneously on different channels. This allows for greater spectral efficiency use within the network, as different pairs of devices may communicate simultaneously on different channels without creating interference. In some cases, a supervisory device (e.g., a FAR/Root, etc.) may overlay a broadcast schedule on top of the individual unicast schedules 600. Such a schedule may be active for a fraction of the time (e.g., a given device may use the broadcast schedule 25% of the time) and used to convey broadcast messages throughout the network.

A device may synchronize its listening, or, more generally, its channel hopping schedule, with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time. However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

Figure 6B:
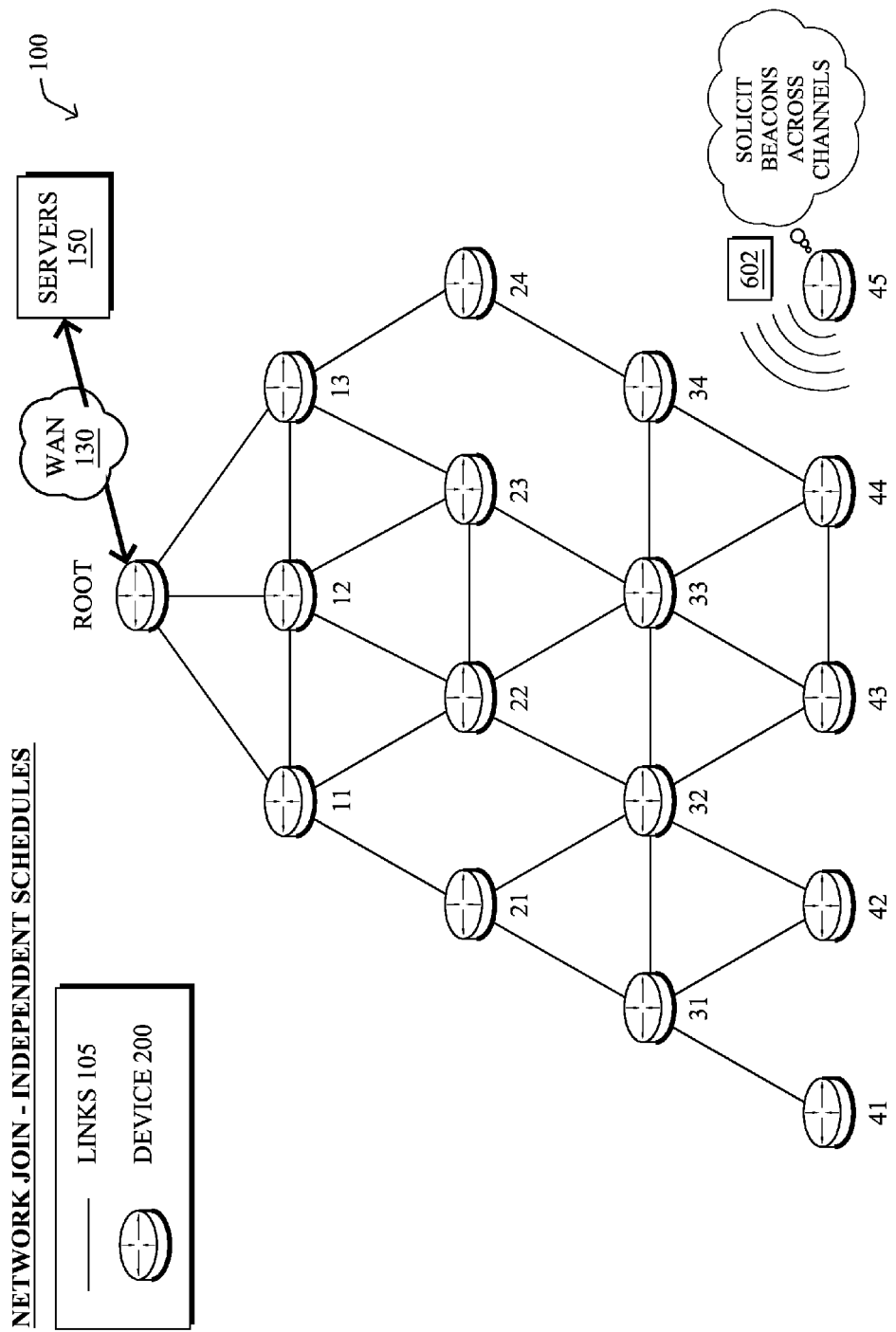
Figure 6C:
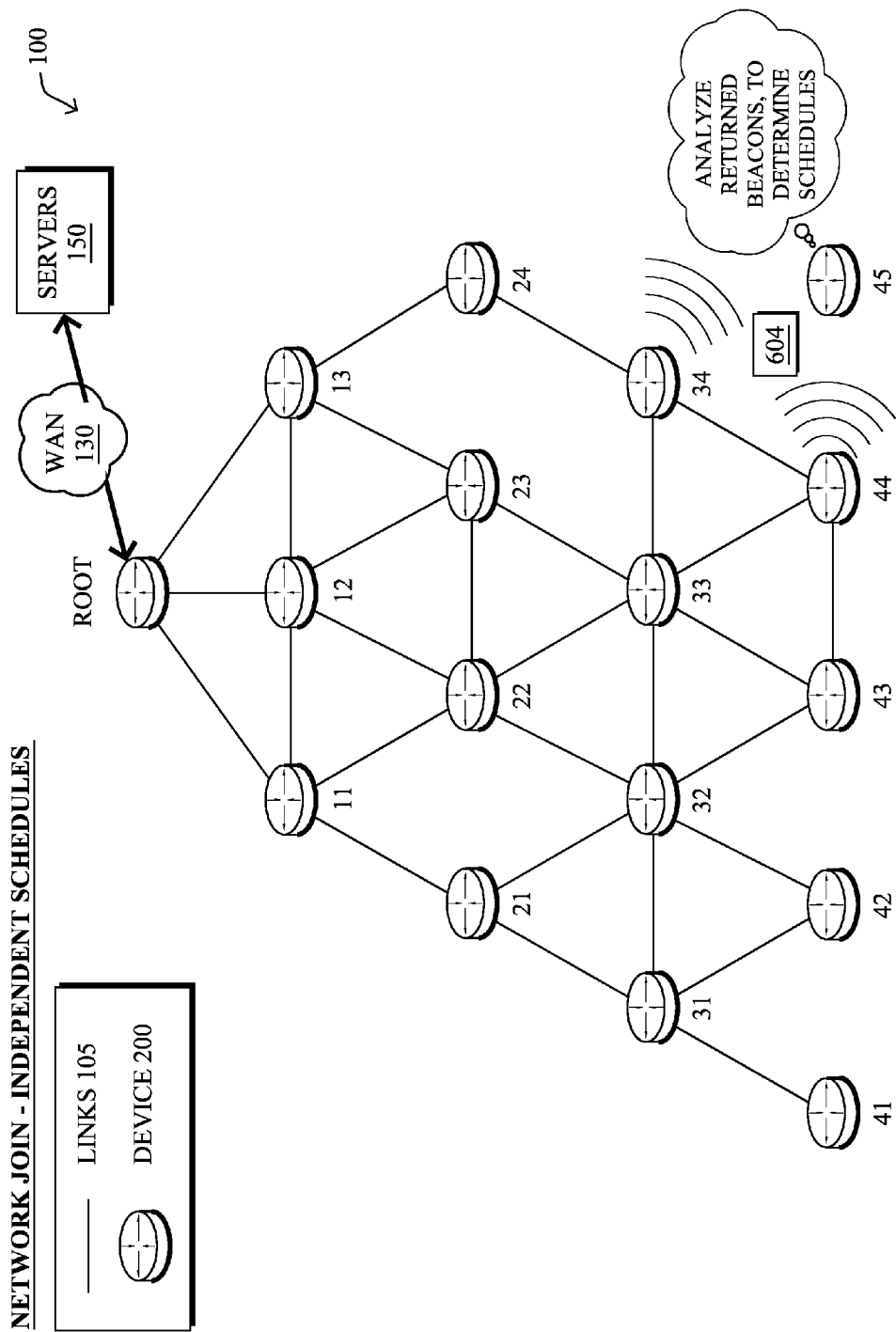
Figure 6D:
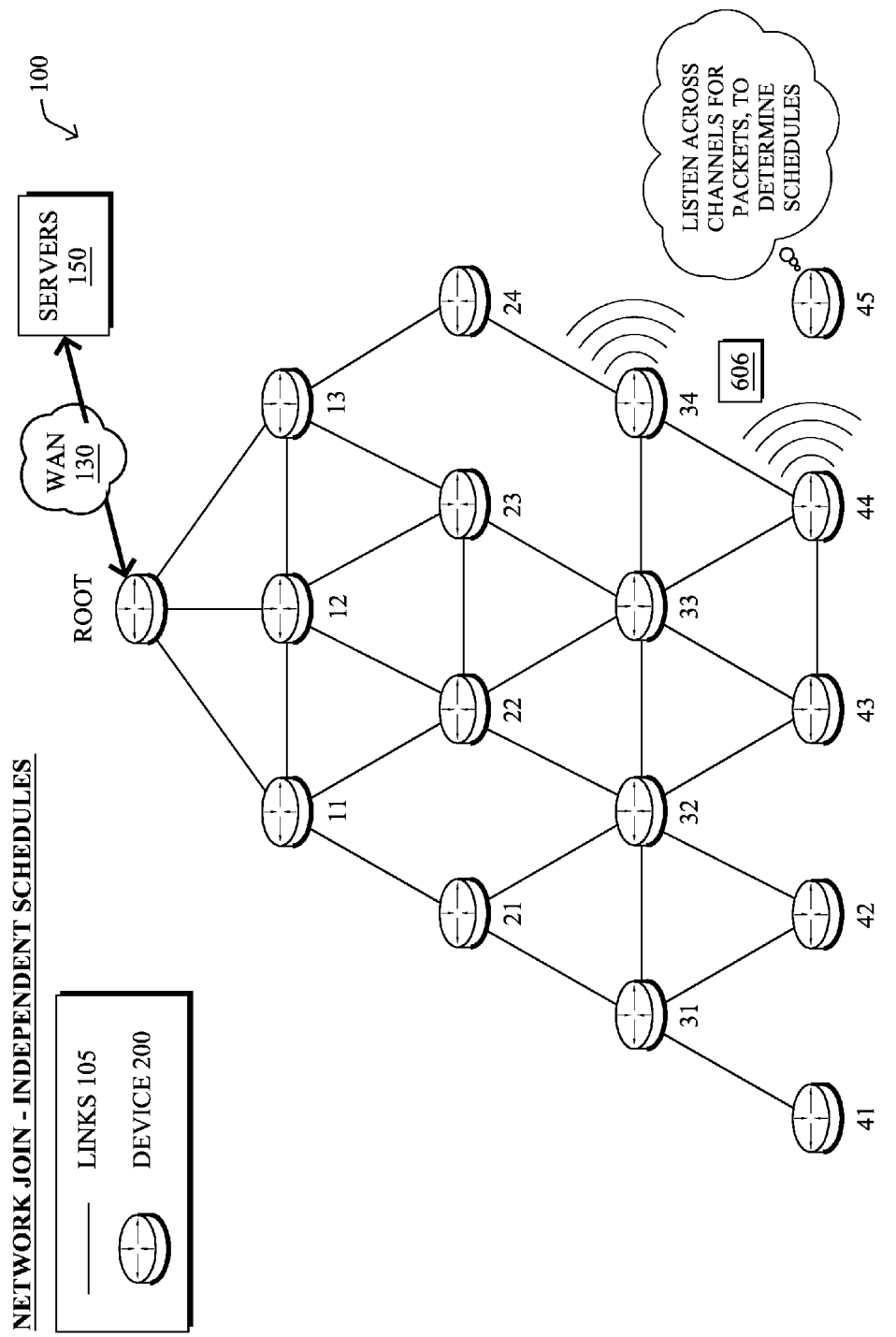

In general, network discovery involves discovering at least one neighbor already joined to the network. However, discovering the first neighbor when individual listen schedules are used can be expensive in terms of network join time, computational resources, and power resources. In some cases, a joining device may transmit across all channels, to solicit a beacon from any neighboring devices. For example, as shown in FIG. 6B, joining node 45 may send beacon requests 602 across the different channels. In response, as shown in FIG. 6C, neighboring devices (e.g., node 34, node 44, etc.) may return beacons 604, thereby allowing node 45 to discover and join the network. Alternatively, as shown in FIG. 6D, node 45 may listen across the different channels for its neighbors to periodically broadcast packets 606 across all channels.

As noted above, certain LLN devices may have limited resources, particularly with respect to their power sources. For example, many devices (e.g., gas and water meters, etc.) may be battery powered. In such cases, the lack of any form of synchronization in channel hopping schedules may negatively impact the lifespans of the devices. In particular, discovering and joining a network in which individual channel hopping schedules are used may consume battery charge, as the joining node may entail scanning the entire frequency space. In addition, various network events may cause an LLN device to rejoin a network. For example, assume that a power outage occurs in at least a portion of the network, thereby disabling some of the LLN nodes that forward packets on behalf of gas and water meters. Once power is restored, the gas and water meters will then need to rejoin the network by repeating the network discovery process. Additionally, using individual channel hopping schedules may increase network formation latency, as additional time may be needed for joining devices to determine the channels used by already joined neighbors.

Network Discovery in LLNs

The techniques herein provide for network discovery mechanisms whereby devices use a common channel hopping schedule for purposes of network discovery and individually determined channel hopping schedules for purposes of regular communications. In some aspects, the network discovery channel hopping schedule may be determined by the devices using predefined parameters such as their respective real time clocks, deployment-specific identifiers, etc. Thus, a joining device may already have access to the common channel hopping schedule used in the network for network discovery. In a further aspect, a device that is already part of the network may switch from using its individual channel hopping schedule to the common network discovery channel hopping schedule. For example, the device may switch to the common channel hopping schedule to periodically send beacons during normal network operations (e.g., to facilitate new devices joining the network) or in response to a power outage event (e.g., to facilitate devices rejoining the network once power is restored). In further aspects, the switchover from a device using its individual channel hopping schedule or the network discovery channel hopping schedule, or vice-versa, may be coordinated by a supervisory network device.

Specifically, according to one or more embodiments of the disclosure as described in detail below, a device in a network determines a first channel hopping schedule for the device to receive unicast communications from one or more neighbors of the device. The first channel hopping schedule differs from channel hopping schedules used by the one or more neighbors to receive unicast communications. The device determines a second channel hopping schedule for the device that includes a common channel usable by the device and the one or more neighbors to request a particular communication channel. The device switches from the first channel hopping schedule to the second channel hopping schedule, in response to a network event. The device causes a particular neighbor to join the network using the second channel hopping schedule.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wireless communication protocols, and as such, may be processed by similar components understood in the art that execute those protocols, accordingly.

Operationally, network nodes/devices may use a common, network-wide channel hopping schedule for purposes of discovering and joining the network. An example of such a channel hopping sequence is shown in FIG. 7A. As shown, each device that is part of the network, as well as any joining devices, may share a common channel hopping schedule/sequence 700. In other words, the LLN devices may be preconfigured to be able to determine and use schedule 700, such as when a device first attempts to join the network. Said differently, each node may self-generate schedule 700 and without the aid of a supervisory/coordinating device. As would be appreciated, this is in sharp contrast to a shared broadcast schedule that may be promulgated by the FAR/Root or another supervisory device.

In various embodiments, a node may self-generate channel hopping schedule 700 based on a global time maintained by the various devices. For example, devices already attached to network 100 and any joining devices may determine channel hopping schedule 700 based on their real time clocks (e.g., real time clock 252). In other words, different devices may be internally configured to use schedule 700, without needing to communicate information regarding schedule 700 between devices. In one embodiment, channel hopping schedule 700 may also be seeded using a deployment-specific identifier (e.g., a utility ID, an SSID, or the like). Notably, using a deployment-specific or other identifier to determine schedule 700 may minimize interference between different deployments that overlap geographically. Such an identifier may be used, for example, to control how channels and/or hop times are selected for each slot of channel hopping schedule 700. Accordingly, a device attempting to join the network may be preconfigured to use channel hopping schedule 700 based on parameters set at the time of manufacture and/or prior to deployment in the field.

To account for any potential synchronization errors across the real time clocks of the different devices, channel hopping schedule 700 may be configured to have relatively long dwell times (e.g., in contrast to channel hopping schedules 600). For example, devices using channel hopping schedule 700 may remain on the current channel on the order of seconds before hopping to the next scheduled frequency. Channel hopping schedule 700 may also have a low duty cycle to enable low-power network discovery by allowing the joining device to shut off its transceiver for a long duration between active slots in channel-hopping schedule 700. Thus, in contrast to the individual unicast schedules of the devices and/or any broadcast schedules used by the devices, channel hopping schedule 700 may not require as stringent of synchronization between devices, allowing devices that have been disconnected from the network for some time to communicate more efficiently.

Figure 7B:
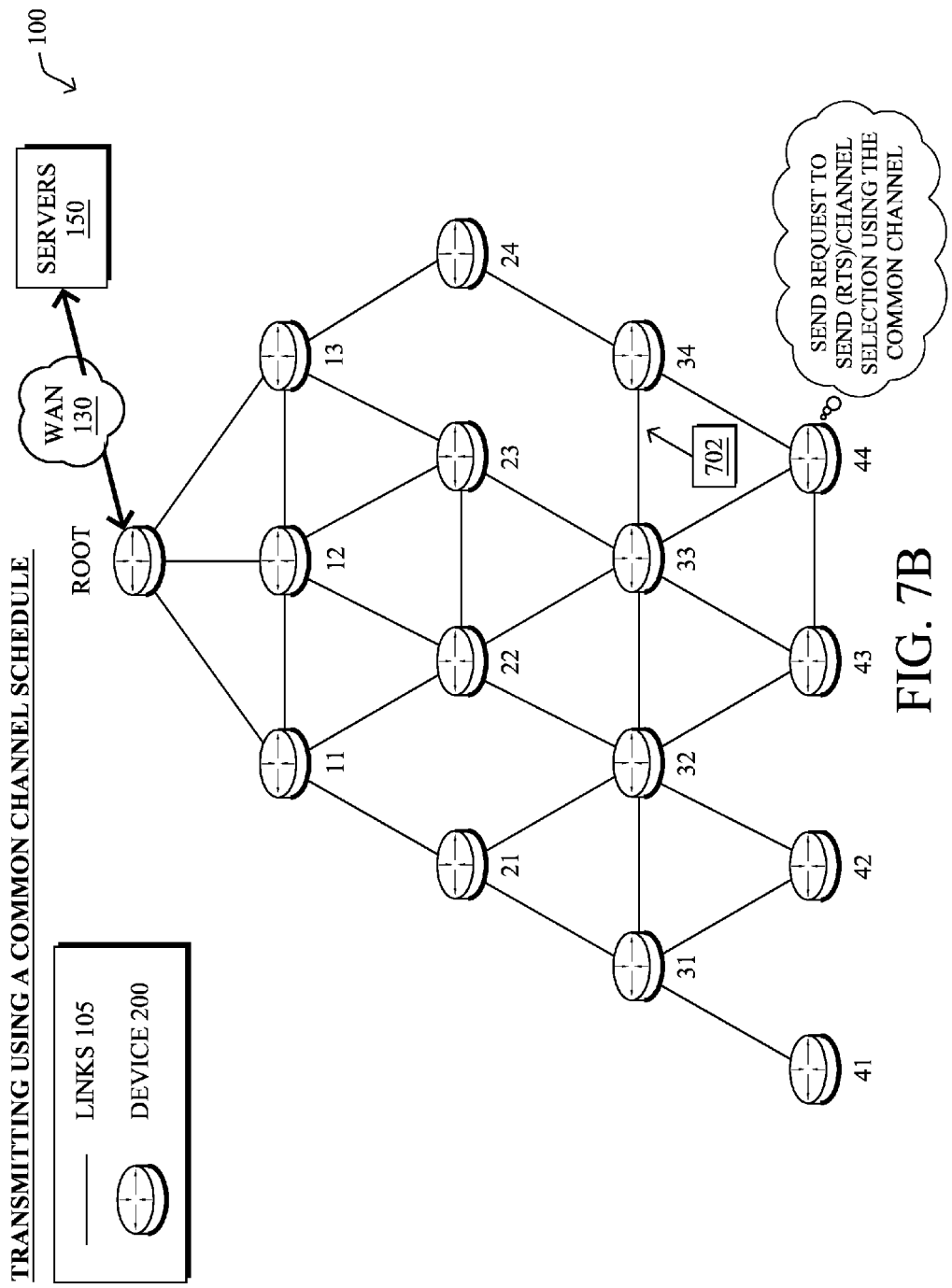
Figure 7C:
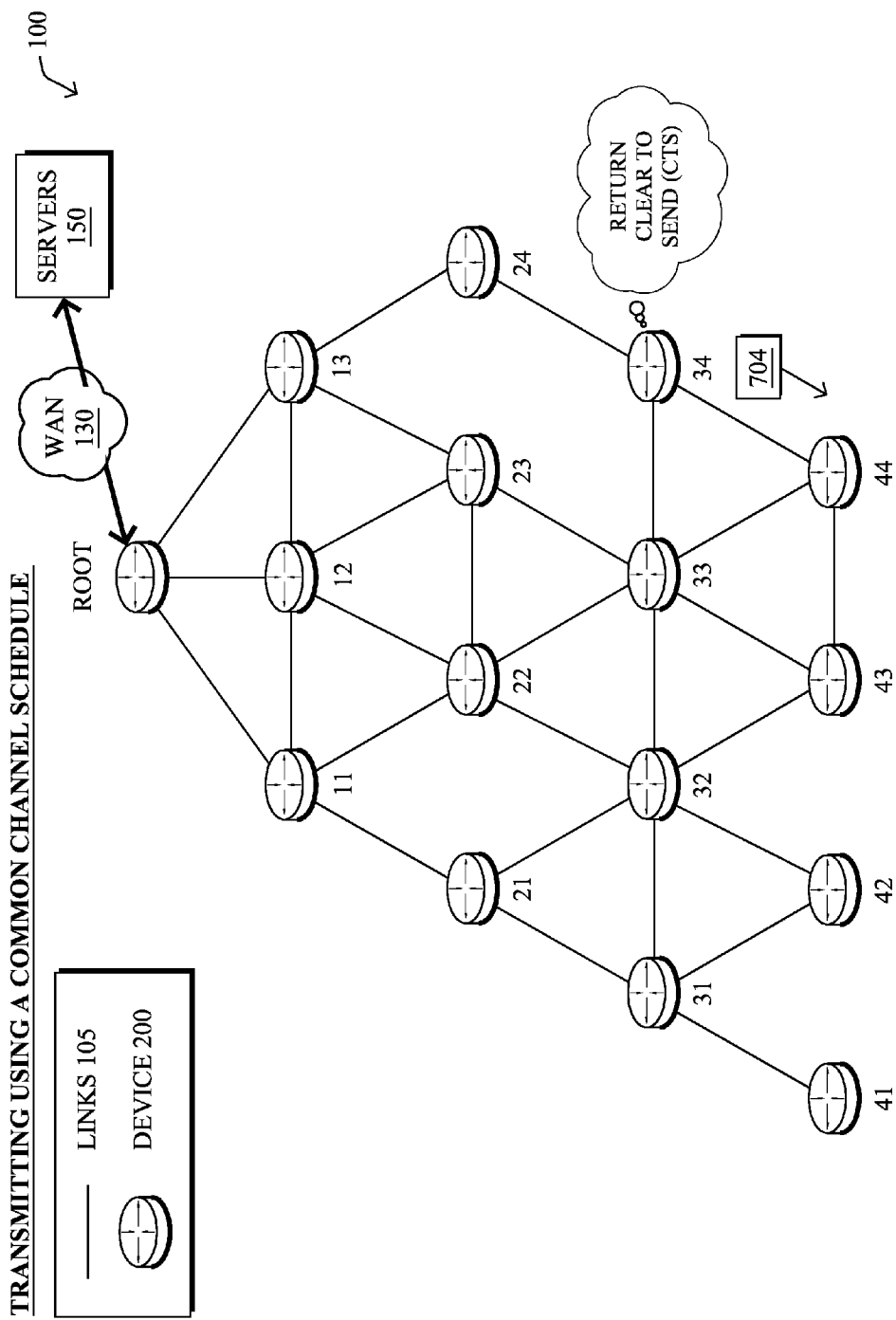
Figure 7D:
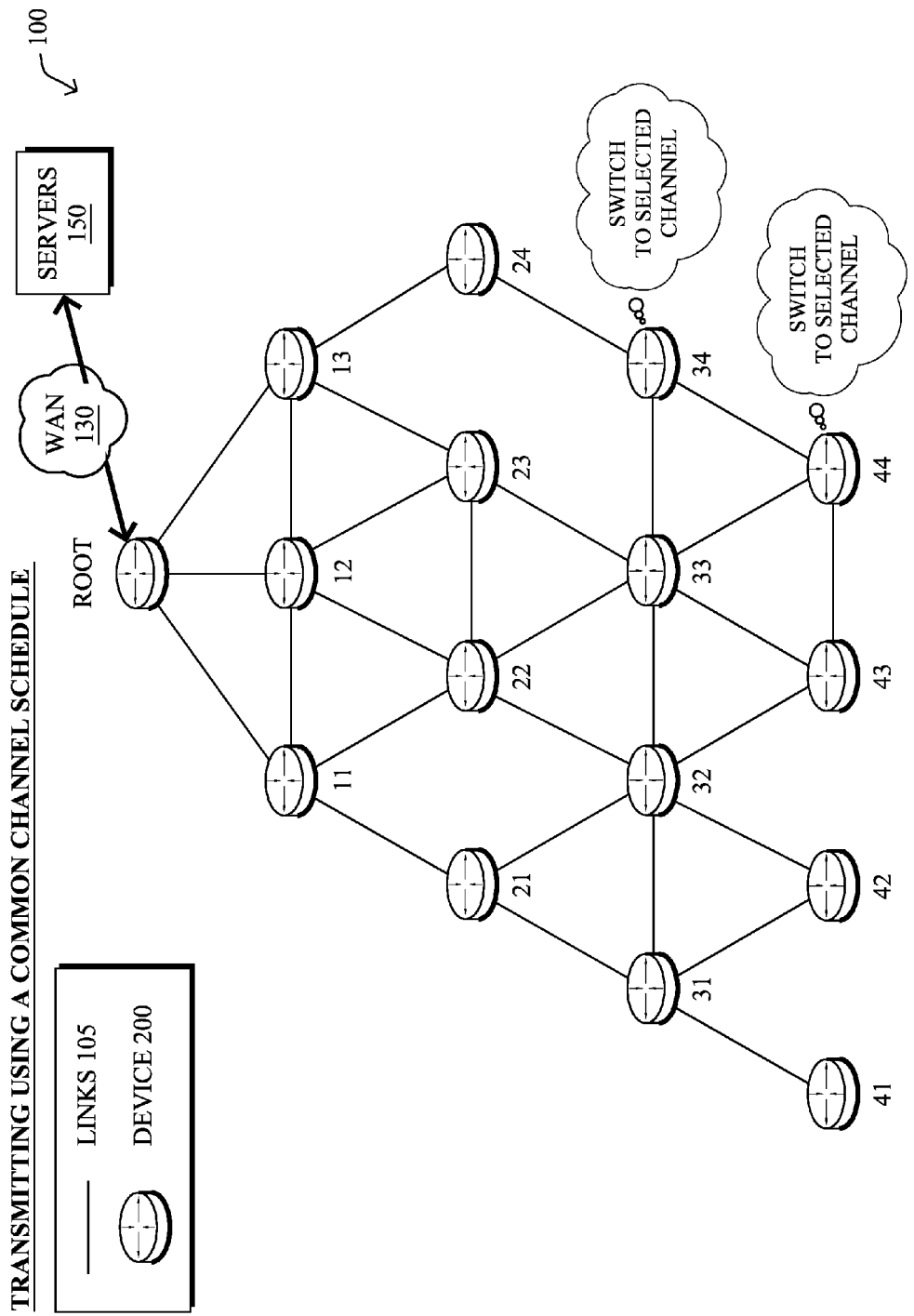

Since each device following channel hopping schedule 700 shares a common channel, communications between devices may proceed as follows. First, at any point in time, all devices in the system listen to the common channel according to channel hopping schedule 700. Next, when a particular device wants to send a data transmission, it sends a request to send (RTS) message that includes a selected channel number via the common channel. For example, as shown in FIG. 7B, node 44 may send a RTS message 702 to node 34 that includes a selected channel over the common channel of channel hopping schedule 700. In response, the device that receives the RTS message may return a clear to send (CTS) message that serves as an acknowledgement to the RTS. For example, as shown in FIG. 7C, node 34 may return a CTS message 704 to node 44, in response to receiving RTS message 702. After the RTS/CTS exchange, the devices then switch to the channel indicated by the RTS message, to begin the data transmission. For example, in FIG. 7D, nodes 34 and 44 may switch to the channel specified in RTS message 702 after the RTS/CTS exchange.

Figure 7E:
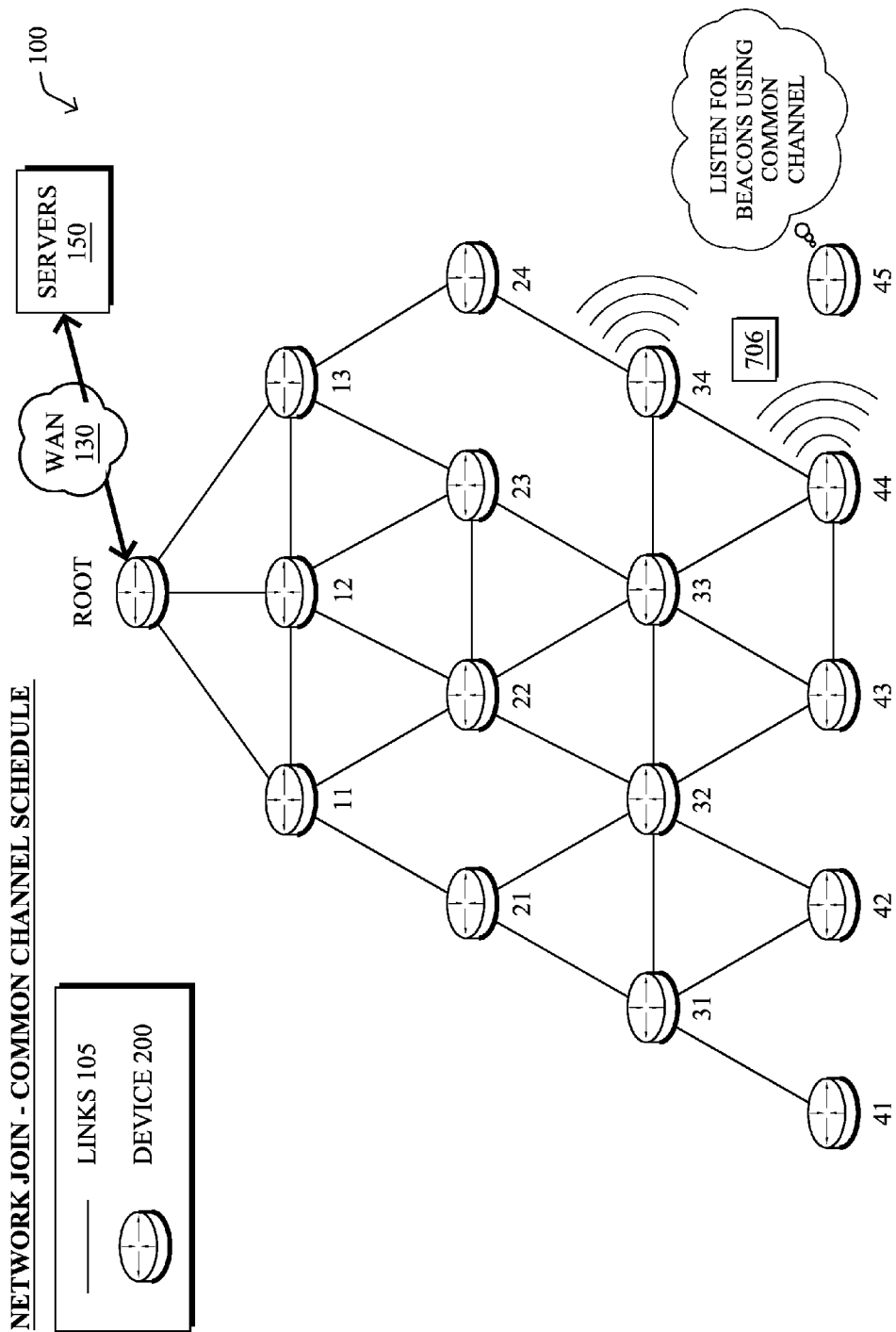

As would be appreciated, channel hopping schedule 700 may allow devices to join network 100 without having to first synchronize with the individualized channel hopping schedule of the nearest device that is already joined to network 100. With a long dwell time (e.g., approximately 6 seconds), a device with a proper real time clock set in the factory can be powered on after deployment and immediately determine what channel use for purposes of network discovery. For example, as shown in FIG. 7E, node 45 may join network 100 by tuning into the common channel according to channel hopping schedule 700 and listen for beacons 706 sent by any of the nodes that are already joined to network 100. Alternatively, node 45 may actively solicit beacons 706 via the common channel, if power resources are less of a concern. In various embodiments, nodes in network 100 may use channel hopping schedule 700 for purposes of data communications (e.g., to send data packets directly), to complete an RTS/CTS exchange before sending data packets on a different channel, or both. For example, a node may initiate an RTS/CTS exchange on the common channel when the size of the data packets exceed a threshold, so as not to tie up the common channel.

While channel hopping schedule 700 facilitates network discovery, there are also tradeoffs to using a common channel with a long dwell interval. First, the long dwell interval makes the network more susceptible to channel interference. For example, whenever the network hops to a channel that has significant interference, the network is incapable of communicating for the dwell interval of the channel (e.g., up to six seconds). Second, having all devices synchronized to the same hopping schedule limits frequency diversity and overall network capacity since neighboring source-destination pairs must share the same channel and cannot communicate simultaneously.

Referring now to FIGS. 8A-8E, an example of a device using dual channel hopping schedules is shown, according to various embodiments. According to various embodiments, network devices may use a slow-hopping schedule with a common channel for purposes of network discovery and individually configured channel hopping schedules for purposes of standard data transmissions. Using a slow hopping approach makes network joins more efficient, especially for gas/water meters, while still supporting a channel-hopping strategy that does not require network-wide synchronization after the node has joined the network.

Figure 8A:
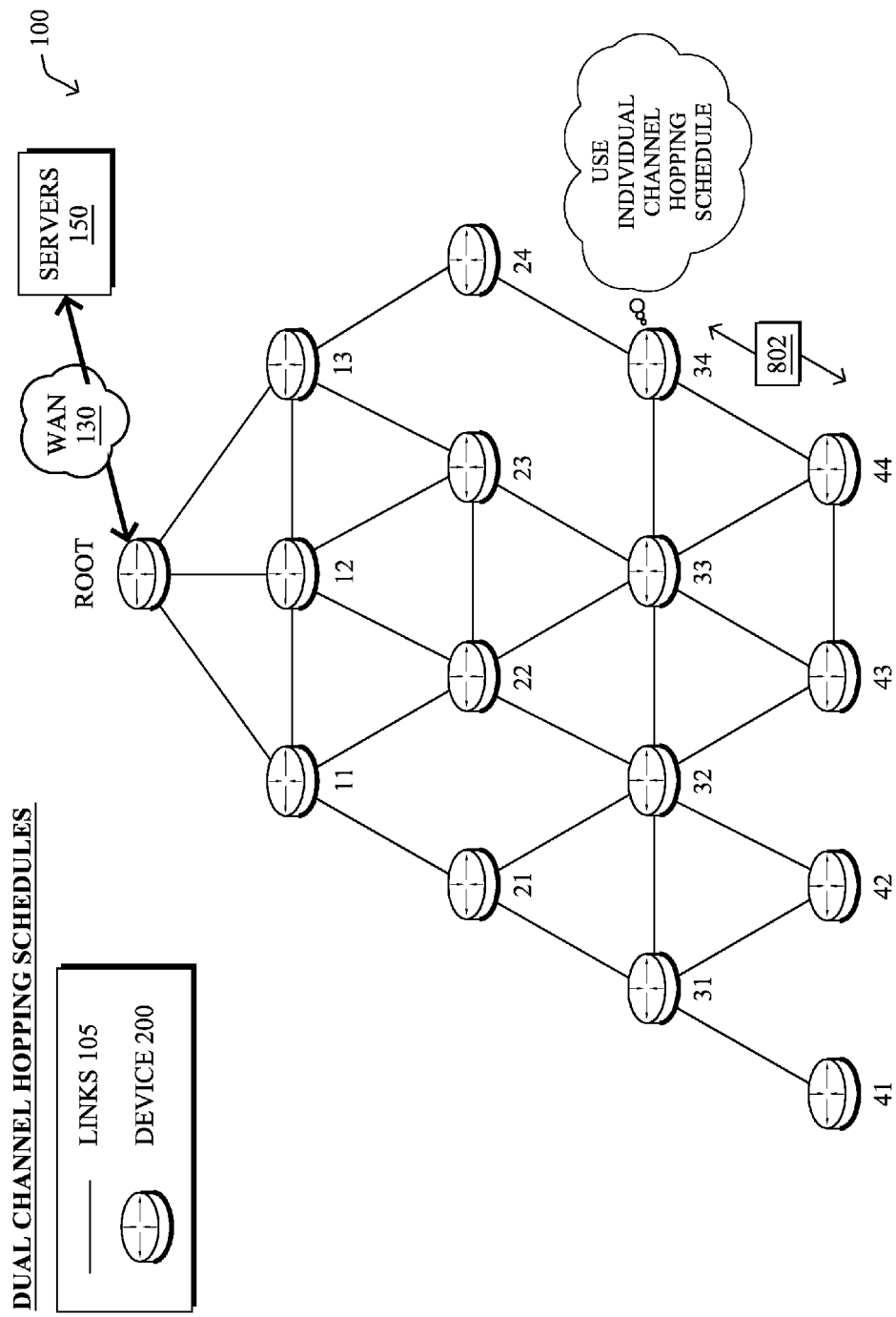
FIGS. 8A-8E illustrate an example of a device using dual channel hopping schedules.
Figure 8B:
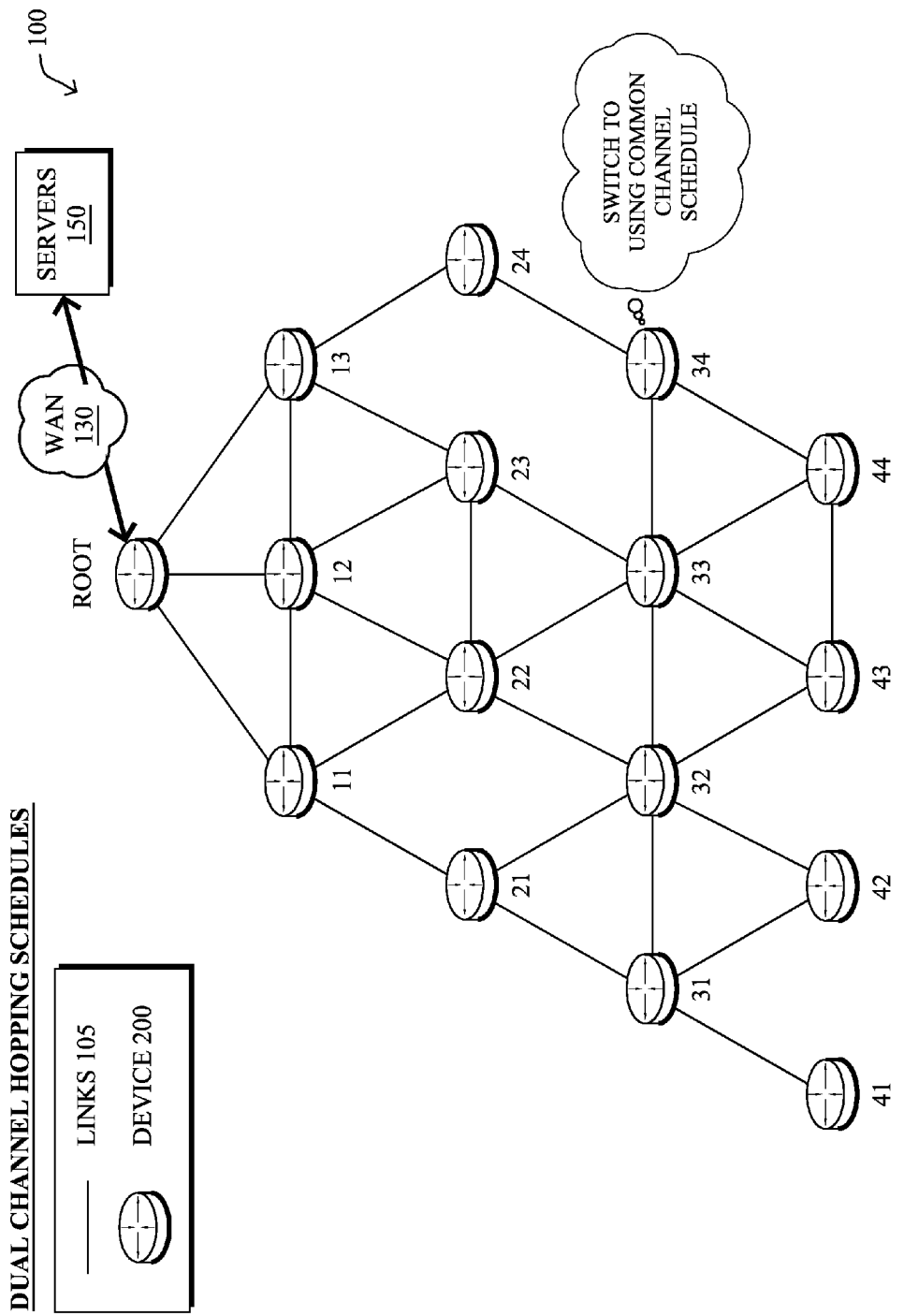
Figure 8C:
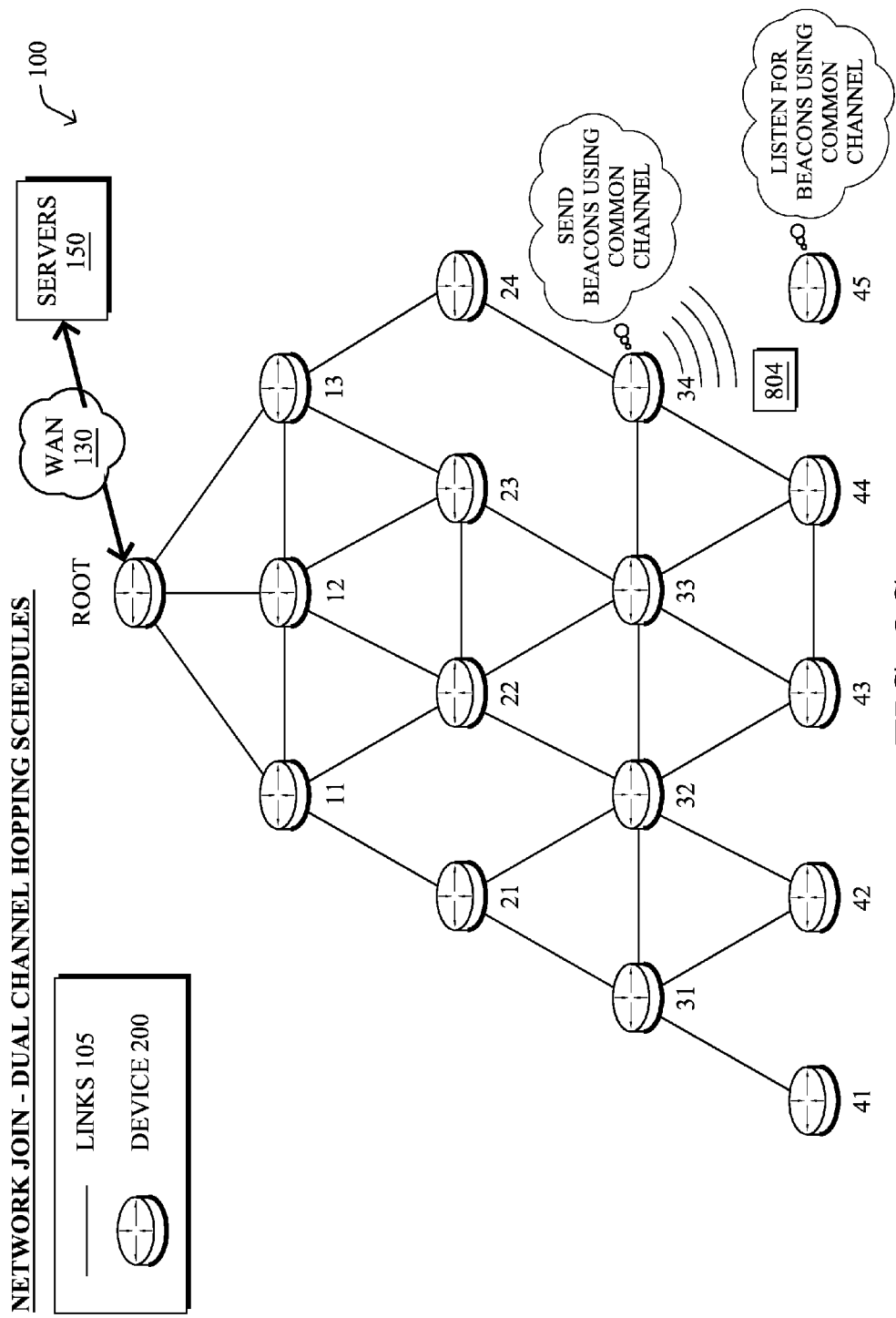

A device that is already joined to the network may dynamically switch between its independent channel hopping schedule and the long-dwell, shared command channel schedule, to allow a neighboring device to join the network. For example, as shown in FIG. 8A, assume that node 34 follows its own independent channel hopping schedule (e.g., one of schedules 600), to communicate data 802 with node 44. In FIG. 8B, node 34 may switch to using the common channel schedule (e.g., channel hopping schedule 700), to facilitate network joins by any neighboring devices. For example, as shown in FIG. 8C, assume that node 45 is a neighbor of node 34 and is not currently connected to network 100. Using the common channel, node 34 may send beacons 804. In various embodiments, when node 45 is in its network join mode, it may listen on the shared command channel for beacons 804, thereby allowing it to discover node 34 and network 100. As mentioned previously, node 45 may be preconfigured to use the shared command channel schedule while in its network join mode (e.g., based on its real time clock, a deployment identifier, etc.). For example, once node 45 is deployed and enabled, node 45 may begin activating its receiver using the common channel-hopping schedule defined for network discovery. Node 45 may then attempt to receive a beacon that announces the presence of network 100 by periodically listening to the shared command channel at given times specified by the channel-hopping function.

Figure 8D:
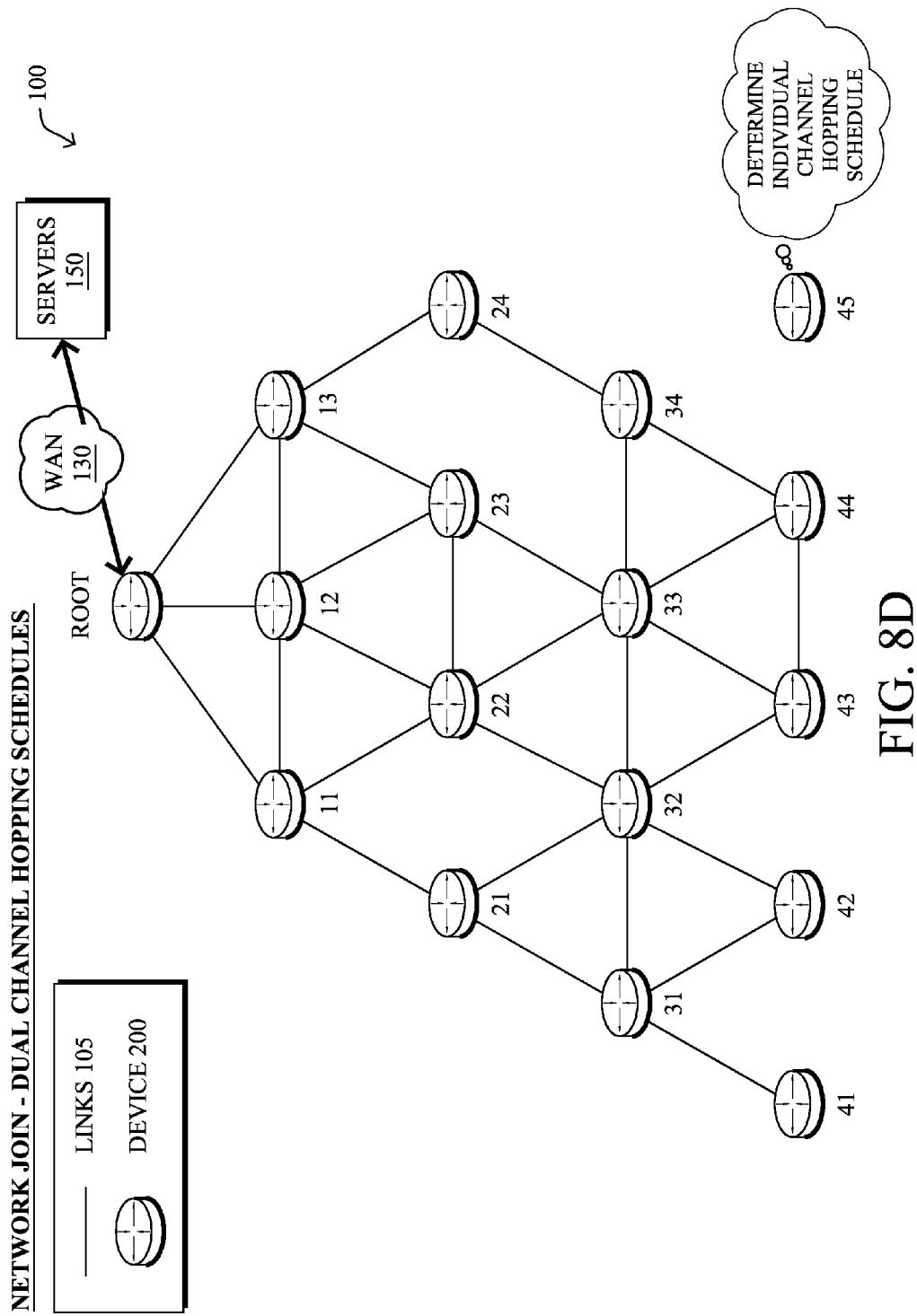
Figure 8E:
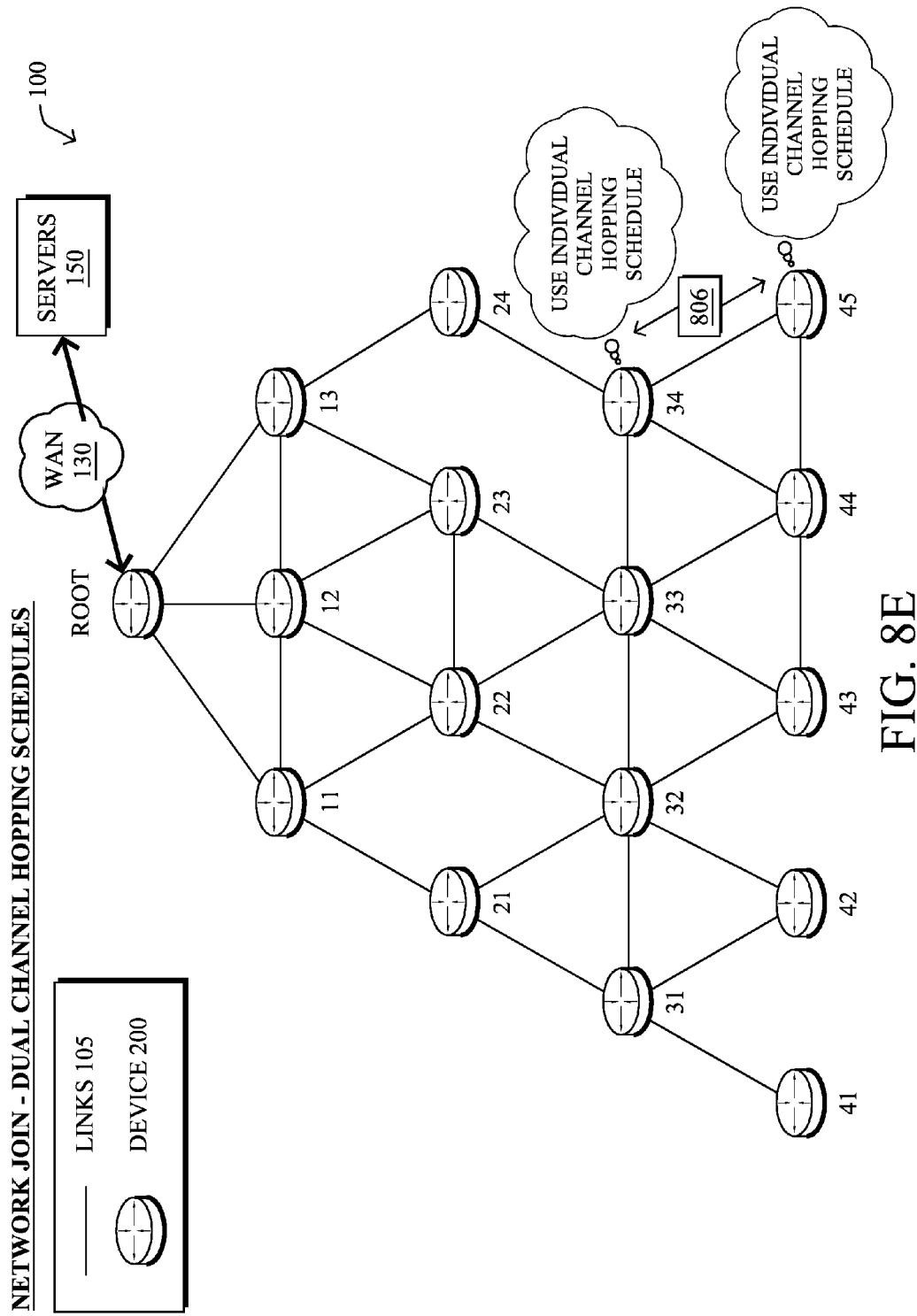

Once node 45 has discovered network 100, it may switch to using its own, individual channel hopping schedule, as shown in FIG. 8D. For example, node 45 may determine its own channel hopping schedule by negotiating with its neighboring nodes or, alternatively, being assigned an individualized channel hopping schedule by another device/node. Node 34 and 45 may then use the individual channel hopping schedule for data transmissions 806, as shown in FIG. 8E. In other words, the nodes may only use the shared command channel schedule during the network join process and may switch to using their individual channel hopping schedules at a later time for purposes of normal data communications.

Any number of different network events may cause a node that has already joined the network (e.g., a smart meter, etc.) to switch to the common channel used for network discovery. In one embodiment, the network event may be a periodic time according to the global time maintained by the network devices. For example, node 34 may periodically switch between using its own channel hopping schedule and the shared command channel, to periodically send beacons out to any neighbors that may wish to join network 100. In other words, the "network event" may correspond to an internal timer of a node signaling that the node should switch to or from the schedule used to facilitate network joins. In another embodiment, the network event may correspond to a power outage event. For example, node 34 may switch to using the shared command schedule, in response to a power outage event, to allow neighboring nodes to rejoin the network after power is restored.

In one embodiment, network joins using the shared command channel may be optional. For example, a portable electronic device (e.g., a handheld device) may solicit beacons using a channel hopping schedule that has a higher duty cycle. In such a case, a field technician may speed up the network join process using the portable electronic device. In other words, the portable electronic device may be responsible for transmitting enhanced beacon requests (e.g., solicitations) to any neighboring devices that are already joined to the network on behalf of a joining device (e.g., a gas/water meter). Notably, the portable electronic device may be recharged regularly, in contrast to the joining device, and may not be under the same low-power constraints as the joining device. At the same time, the field technician may place the joining device into a mode that involves using the network discovery schedule with the higher duty cycle. After some time, the node will either join the network or may time out and return to using the network discovery schedule with lower duty cycle. For example, a joining device may normally use a schedule that only wakes up every $10^{th}$ slot. However, when a portable device is used as part of the network join process, the joining device may instead listen to every slot. Of note is that the slots of the common channel hopping schedule may still be long, to account for synchronization errors.

FIGS. 9A-9E illustrate an example of network discovery after a power outage event, in accordance with various embodiments described herein. Notably, an important operation of Smart Grid AMI networks is to provide communication and notification of power outages and power restorations (e.g., to allow a utility to deploy repair technicians, etc). At a minimum, the mesh network is typically required to support Power Outage Notification (PON) and Power Restoration Notification (PRN) messages. PON messages allow a utility to determine the occurrence and location of power outages. Similarly, PRN messages allow a utility to determine when and where power is restored. Both message types may be used in a number of different ways. For example, PRN messages following PON messages can also be used to determine the duration of the power outage event (e.g., whether the outage is momentary, temporary, or sustained). Further, PRN messages may also prevent unnecessary truck rolls (e.g., technician deployments) that may be triggered by PON messages. PRN messages can also provide real time feedback to the utility, when working to restore power in the field.

In some cases, the techniques herein may allow certain network devices to dynamically switch between channel hopping strategies, in response to power outage and power restoration events. In particular, all or a subset of devices in the network may switch to using the slow-hopping, shared command channel schedule following a power outage event, in anticipation of a power restoration event. In some cases, the shared command channel schedule may be used to optimize both network (re)formation, as well as facilitating the transmission of power restoration notification (PRN) messages. Following the power restoration event, the devices may dynamically switch back to normal operation, allowing channel capacity and throughput also to be optimized.

Figure 9A:
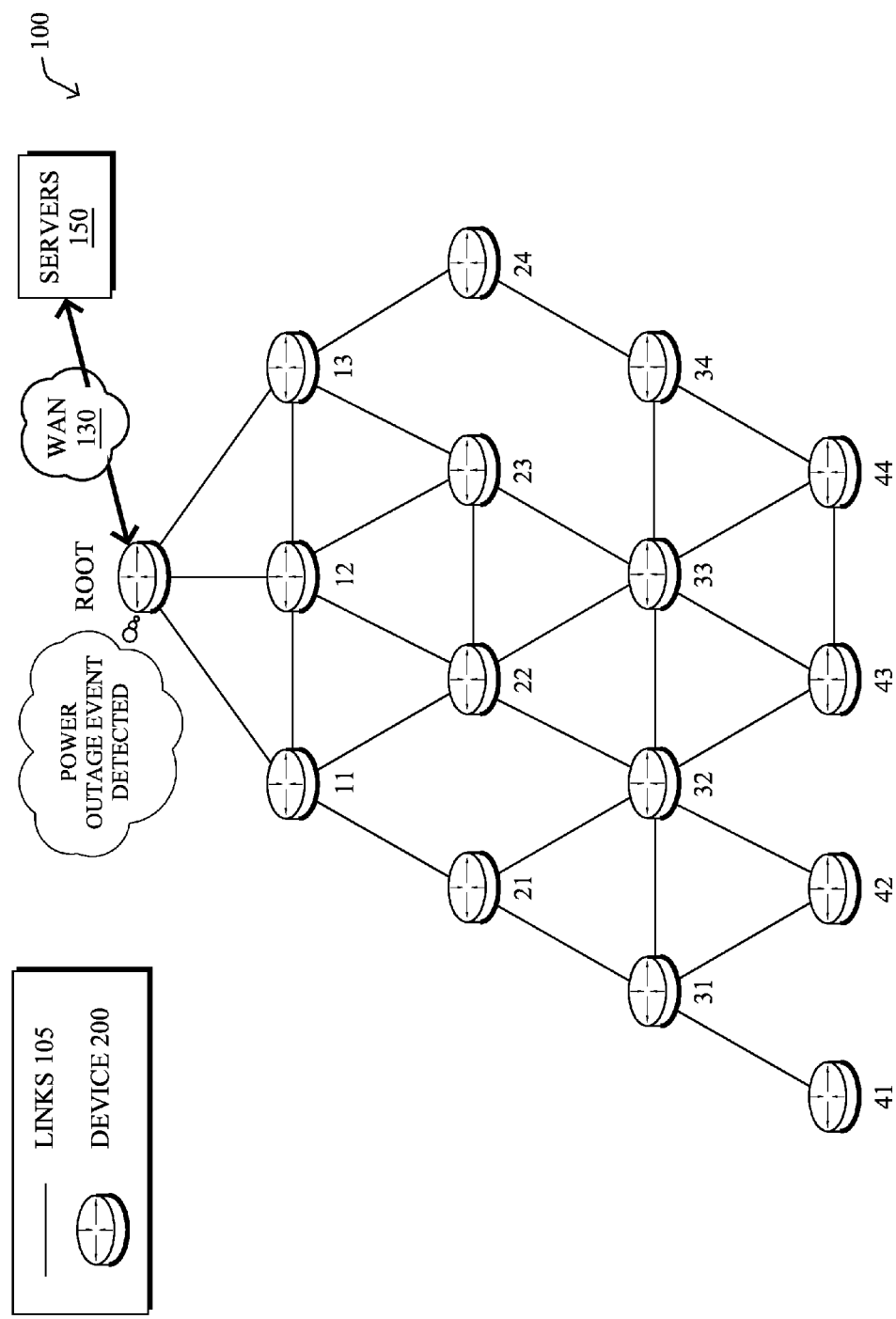
FIGS. 9A-9E illustrate an example of network discovery after a power outage event.
Figure 9B:
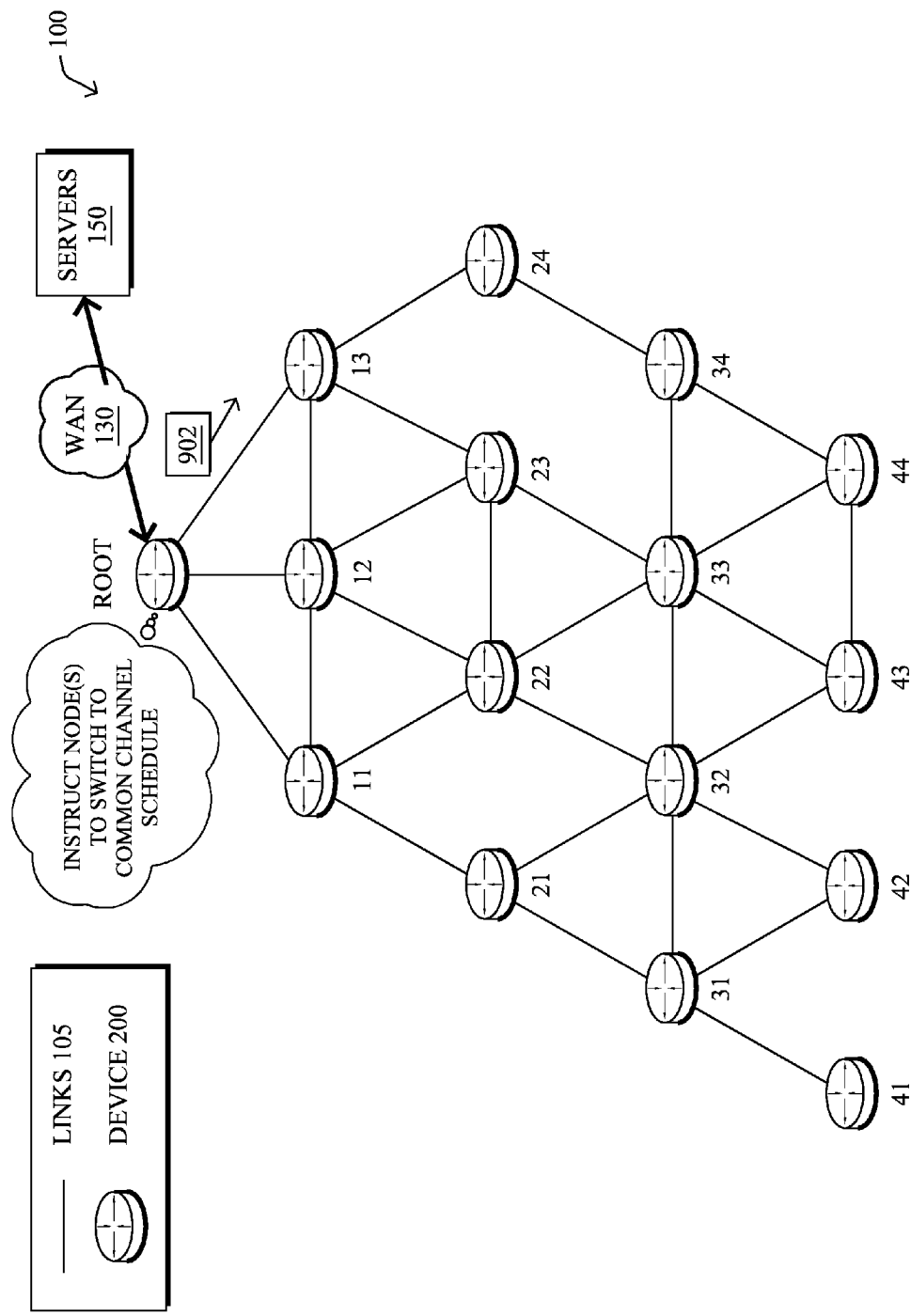

In various embodiments, one or more nodes that is unaffected by a power outage event may switch to using the slow-hopping, shared command channel schedule, in response to detecting a power outage event. For example, as shown in FIG. 9A, assume that the FAR/Root or another supervisory device (e.g., an NMS in servers 150, etc.) determines that a power outage event is detected (e.g., in response to receiving a power outage notification (PON) message). In response, as shown in FIG. 9B, the supervisory device may send an instruction 902 to one or more unaffected devices, to cause the receiving device to switch to the network discovery channel hopping schedule.

In one embodiment, the switchover to the network discovery channel hopping schedule may be network wide. For example, instructions 902 may be multicast throughout network 100, thereby causing any receiving devices to switch to the network discovery hopping schedule. In another embodiment, the switch may only involve a subset of the devices still operational in network 100.

In further embodiments, devices local to the power outage event may switch to using the network discovery channel hopping schedule. For example, a device that receives a broadcast PON message (e.g., a "last gasp" message) may switch to the network discovery channel hopping schedule in response, while other devices that do not receive a PON message may continue normal operation using their individual channel hopping schedules. In some cases, this approach may be extended to a threshold radius around the power outage whereby only devices within a certain number of hops from the originator of a PON switch to the network discovery hopping schedule. In a further embodiment, an arbitrary subset of devices may be selected to switch to the network discovery channel hopping schedule. For example, subsets may be selected based on certain node attributes (e.g., battery backup devices, backbone devices, DAG parents of affected devices, etc.), to meet a minimal device density threshold, etc.

Figure 9C:
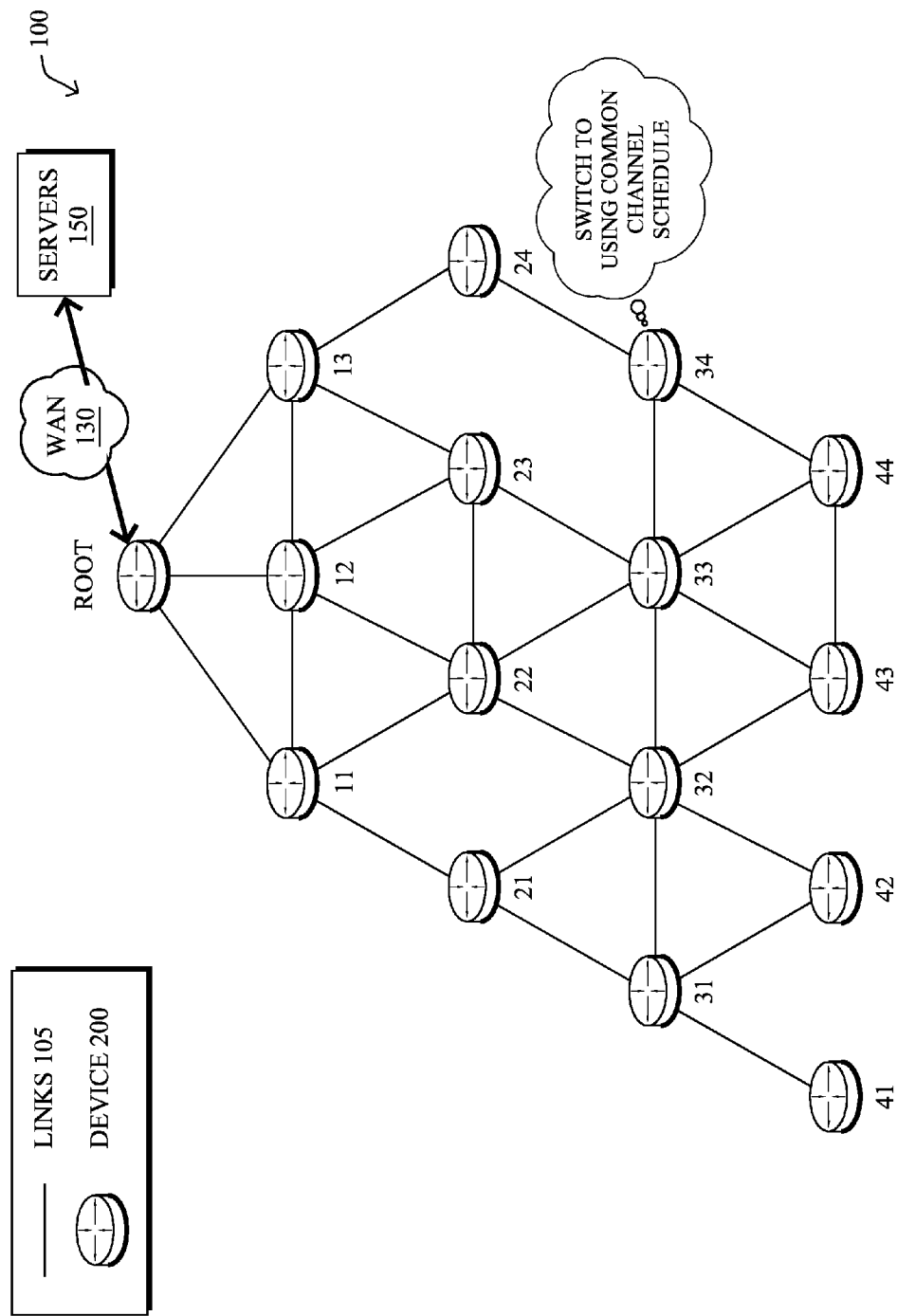

As shown in FIG. 9C, node 34 may switch to using the common channel schedule, to facilitate nodes affected by the power outage rejoining network 100. In various embodiments, the switchover may be coordinated with its neighboring nodes. Notably, while any device can immediately switch to using the common channel schedule (e.g., based on its real time clock), the switchover may still be coordinated, in some cases. In one embodiment, the coordination may be reactive where a device that cannot communicate using the normal channel-hopping method may attempt to use the shared command channel schedule when communication is failing. In another embodiment, the device may broadcast a message to neighboring devices that indicates when the switchover will occur (e.g., a time delay relative to the current time of its real time clock). In some cases, the device may also broadcast after the switch, indicating that it has already switched. In yet another embodiment, a message may be sent from the FAR/NMS to all devices in the network, to coordinate when switchovers occur.

Figure 9D:
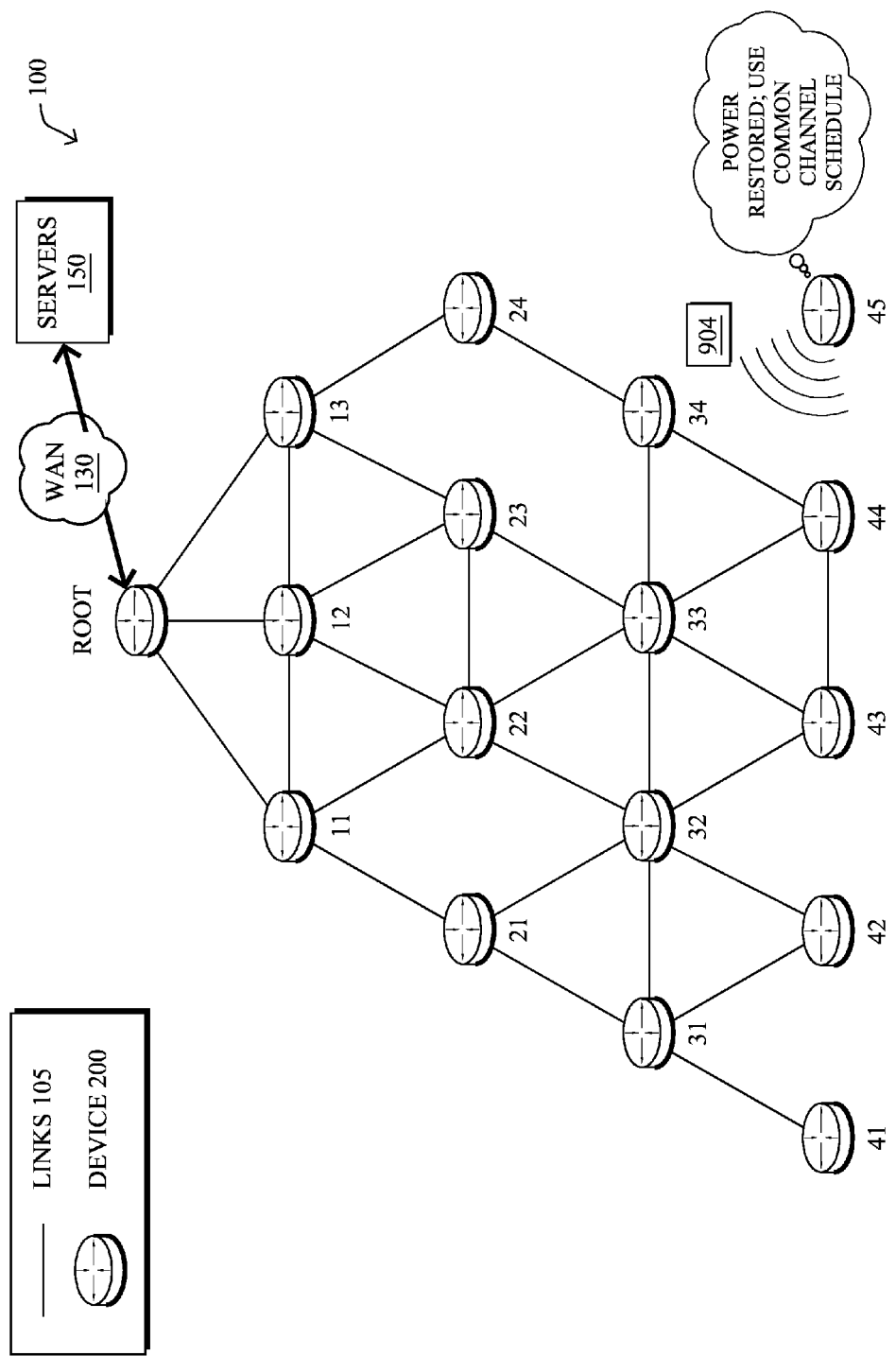

Devices that experience power restoration may also use the slow-hopping, shared command channel schedule, to rejoin the network. For example, as shown in FIG. 9D, node 45 may be configured to come online using the shared command channel schedule for purposes of network discovery. Since its neighbors (e.g., node 34, etc.) have switched over to the same schedule in response to the power outage event, node 45 can immediately begin discovering and communicating with its neighbors. In one embodiment, node 45 may immediately broadcast a message 904 using the shared command channel. In one embodiment, message 904 may include a PRN message. As would be appreciated, doing so allows PRN messages to be reported more quickly. In another embodiment, message 904 may be an enhance beacon request (EBR) message or another form of solicitation to discover neighbors of node 45. In a further embodiment, node 45 may listen on the shared command channel for an unsolicited beacon sent by node 34. In yet another embodiment, node 45 may maintain its neighbor set through the power outage event (e.g., using persistent storage, battery backup memory, etc.) and immediately attempt to communicate with neighboring devices using the common command channel (e.g., by sending a RTC message to a particular neighbor).

To prepare for the switchover back to using individualized channel hopping schedules, the network devices may perform pair-wise synchronizations using the shared command channel schedule. For example, after node 45 discovers node 34, the two nodes may negotiate to allow their channel hopping schedules to be individualized.

Figure 9E:
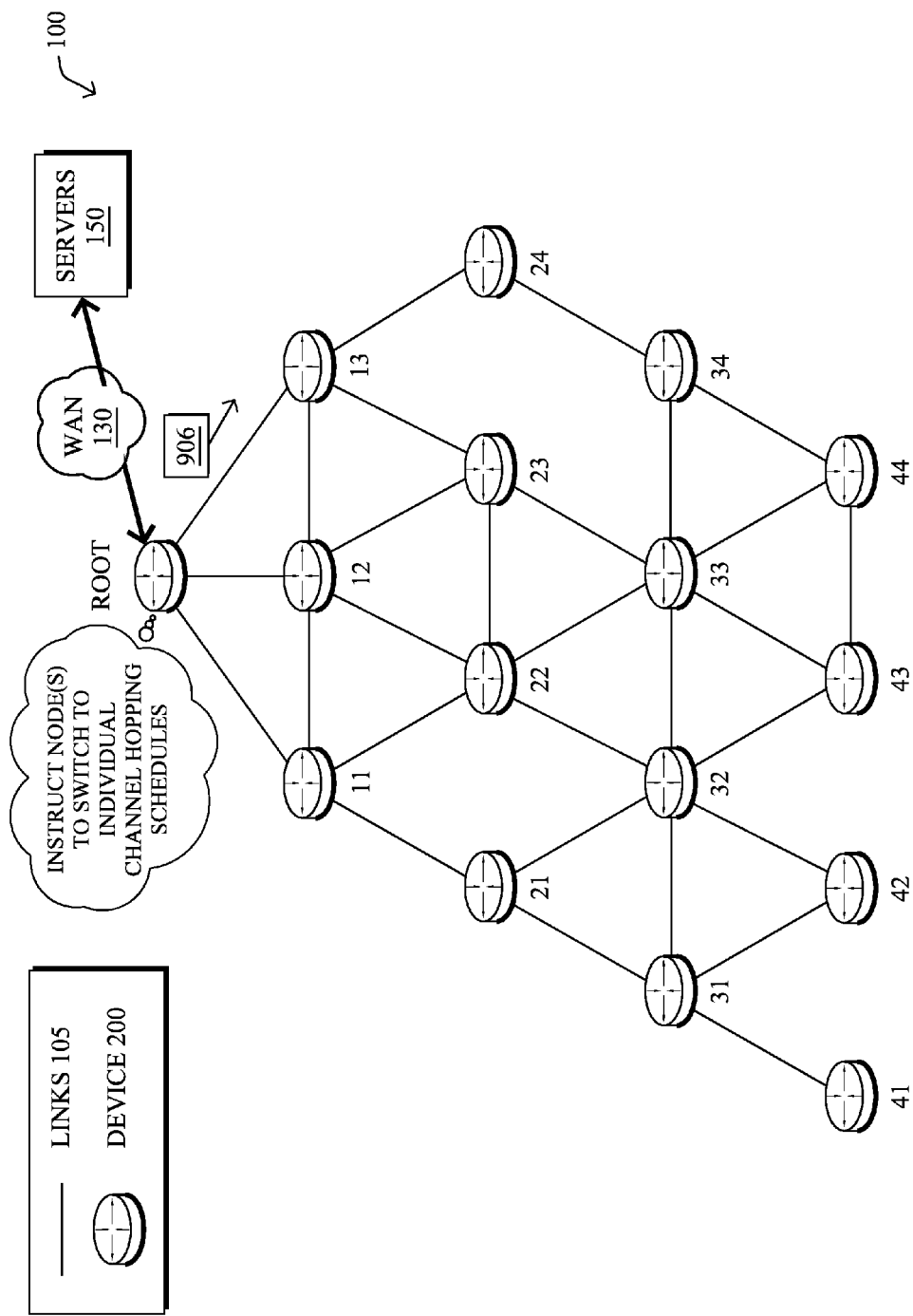

Once power has been restored to the network, the network devices may switch back to using individualized channel hopping schedules for purposes of transmitting data in network 100. In one embodiment, a supervisory device (e.g., the FAR/Root node, an NMS, etc.) may monitor devices that have had their power restored. The supervisory device can then command all devices to switch to their individual channel-hopping schedules, once all devices have had their power restored. Alternatively, the supervisory device can selectively command devices nearby those with power restored to switch to normal operation, such as in the case where some devices have not had their power restored yet. For example, as shown in FIG. 9E, the FAR/Root node may send an instruction 906 to all devices or to a subset of the devices in network 100, to cause the devices to switch over to using their individual channel hopping schedules. In another embodiment, the LLN devices themselves may locally determine when to switch back to normal operation (e.g., using their individual channel hopping schedules). For example, node 34 may switch over to using its individual channel hopping schedule after a threshold amount of time after receiving PRN messages from any neighbors affected by the power outage.

Figure 10:
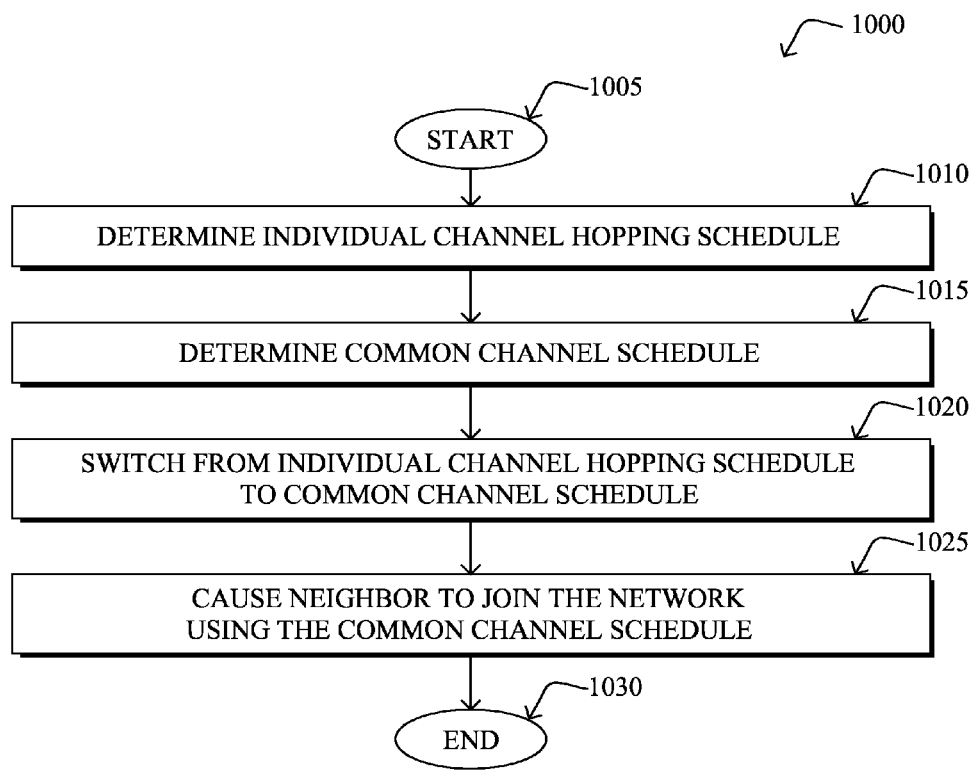
FIG. 10 illustrates an example simplified procedure for causing a neighbor of a device to join the network.

FIG. 10 illustrates an example simplified procedure for causing a neighbor of a device to join a network, in accordance with one or more embodiments described herein. The procedure 1000 may start at step 1005, and continues to step 1010, where, as described in greater detail above, a device (e.g., device 200 executing process 248) determines its individual channel hopping schedule. In various embodiments, such a schedule may be coordinated with those of any neighbors of the device, to allow for frequency and/or time diversity within the network (e.g., different neighboring pairs use different frequencies at any given point in time). Notably, the individual channel hopping schedule of the device may differ from those of its one or more neighbors for purposes of conveying unicast messages throughout the network.

At step 1015, as described in greater detail above, the device may determine a common channel schedule. In various embodiments, the common channel schedule may be based on parameters that are preconfigured across the devices. For example, the common channel schedule may be based on the real time clocks of the device and its neighbors, a deployment identifier, or other parameters that may be set during the manufacture or deployment of the device. In other words, a defining characteristic of the common channel schedule is that it may be self-generated by each of the device and its neighbors and without any coordination between them. For example, the device and its neighbors may each determine the common control channel schedule based on their internal real time clocks, a deployment-specific parameter, or other such parameters that are internal to the devices. Notably, this is in contrast to broadcast schedules that are typically coordinated among the device after the devices join the network. In various embodiments, the dwell time of the command channel may be relatively long (e.g., upwards of multiple seconds long), to account for any variations in the real time clocks of the devices. Thus, the common control channel schedule may not require as tight of synchronization as the unicast and broadcast schedules used by the devices. For example, the communication channel of the individual hopping schedule determined in step 1010 may switch channels much more frequently than the shared command channel.

At step 1020, as detailed above, the device may switch from using its individual channel hopping schedule to using the common control channel schedule. For example, the device may switch to using the common control channel schedule, in response to a network event that requires the device to facilitate another device joining the network. In one embodiment, the network event may be a periodic time during which the device is to send out beacons, thereby allowing a new node to join the network. In another embodiment, the network event may be a power outage event in the network. Switching over to the shared command channel schedule in such situations allows the device to prepare for when any neighbors come back online and need to rejoin the network. For example, the device may receive an instruction from a supervisory device (e.g., a FAR/Root node, an NMS, etc.) to switch to using the shared command channel schedule. Alternatively, the device may detect a power outage event on its own (e.g., by receiving a PON message, etc.), and initiate the switchover itself. In some cases, the device may notify any other of its neighbors on the network as to when the switchover is going to occur.

At step 1025, as described in greater detail above, the device causes one of its neighboring devices to join the network using the shared command channel schedule. In various embodiments, a joining node (e.g., a newly joining node, a node rejoining the network after a power outage event, etc.) may be configured to use the shared command channel schedule for purposes of discovering and joining the network. Since both the device and its neighbor use the same schedule, the neighbor may join the network without having to scan channels. Depending on the capabilities of the joining neighbor, the join process may be initiated by either the already-joined device or by the joining neighbor. For example, a joining neighbor with limited power reserves may passively listen for a beacon to be sent by the device using the shared command channel. In other cases, the joining device may broadcast a beacon request using the shared command channel. In some cases, the joining device may immediately transmit a PON message using the shared command channel, after power is restored to the device. At some point after the neighbor (re)joins the network, both the device and the neighbor may subsequently switch over to using individualized channel hopping schedules for purposes of normal communication in the network. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for network nodes/devices to use dual channel hopping schedules. In particular, the devices may use individualized channel hopping schedules for normal communications, thereby providing frequency diversity to the network and increasing the throughput of the network. The devices may also use a shared command channel hopping schedule for purposes of network discovery/joining the network. This schedule may be known to both existing devices in the network and to joining devices (e.g., based on real time clocks of the devices, etc.). Use of this schedule to join the network may reduce power consumption by joining devices (e.g., by not requiring the device to transmit anything to join the network or scan across different channels). This may increase the lifetime of the joining devices and make their lifetimes more predictable, such as in the case of battery powered devices.

The techniques herein may also be applied to power outage events, to allow for enhanced reformation of the network. Notably, one or more devices that are still connected to the network during a power outage event may switch over to the shared command channel schedule, in anticipation of devices coming back online and wanting to rejoin the network. Since the shared command channel schedule is already known by a rejoining node, the rejoining node may also use this channel to send a PON notification immediately after power is restored, thereby enhancing PON reporting.

While there have been shown and described illustrative embodiments that provide for using dual channel hopping schedules in a network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a device in a network, a first channel hopping schedule for the device to receive unicast communications from one or more neighbors of the device, wherein the first channel hopping schedule differs from channel hopping schedules used by the one or more neighbors to receive unicast communications;
    determining, by the device, a common second channel hopping schedule for the device for network discovery that includes channels that are common to the device and the one or more neighbors at every given point in time, wherein the second channel hopping schedule is based on parameters that are preconfigured across the device and the one or more neighbors prior to deployment, and wherein the same common second channel hopping schedule is self-generated by each of the device and the one or more neighbors based on the preconfigured parameters and without aid of a coordinating device;
    switching, by the device, from the first channel hopping schedule to the second channel hopping schedule, in response to a network event; and
    causing, by the device, a particular neighbor to join the network using the second channel hopping schedule.

2. The method as in claim 1, wherein the network event is a power outage event in the network.

3. The method as in claim 1, wherein causing the particular neighbor to join the network using the second channel hopping schedule comprises:

sending, by the device, a beacon to the particular neighbor using one of the common channels.

4. The method as in claim 1, further comprising:
receiving, at the device, a power restoration notification from the particular neighbor using one of the common channels.

5. The method as in claim 1, further comprising:
notifying, by the device, one or more of the neighbors of the device as to when the device is going to switch from the first channel hopping schedule to the second channel hopping schedule.

6. The method as in claim 1, wherein the network event comprises receiving an instruction to switch channel hopping schedules.

7. The method as in claim 1, wherein the second channel hopping schedule is determined by the device based in part on a real time clock of the device.

8. The method as in claim 7, wherein the second channel hopping schedule is determined by the device based further in part on a deployment identifier.

9. The method as in claim 1 wherein channels in the first channel hopping schedule are hopped more frequently than the common channels are hopped in the second channel hopping schedule.

10. The method as in claim 1, further comprising:
switching, by the device, back to the first channel hopping schedule after the particular neighbor joins the network.

11. The method as in claim 1, further comprising:
receiving, at the device, a beacon request from a portable device via a channel of the first channel hopping schedule and on behalf of one of the one or more neighbors; and
providing, by the device, a beacon using the first channel hopping schedule, in response to receiving the beacon request from the portable device.

12. An apparatus, comprising:
one or more network interfaces to communicate with a network;
a processor coupled to the one or more network interfaces and configured to execute a process; and
a memory configured to store the process executable by the processor, the process when executed configured to:
determine a first channel hopping schedule for the apparatus to receive unicast communications from one or more neighbors of the apparatus, wherein the first channel hopping schedule differs from channel hopping schedules used by the one or more neighbors to receive unicast communications;
determine a common second channel hopping schedule for the apparatus for network discovery that includes channels that are common to the apparatus and the one or more neighbors at every given point in time, wherein the second channel hopping schedule is based on parameters that are preconfigured across the device and the one or more neighbors prior to deployment, and wherein the same common second channel hopping schedule is self-generated by each of the device and the one or more neighbors based on the preconfigured parameters and without aid of a coordinating device;
switch from the first channel hopping schedule to the second channel hopping schedule, in response to a network event; and
cause a particular neighbor to join the network using the second channel hopping schedule.

13. The apparatus as in claim 12, wherein the network event is a power outage event in the network.

14. The apparatus as in claim 12, wherein the apparatus causes the particular neighbor to join the network using the second channel hopping schedule by:
sending a beacon to the particular neighbor using one of the common channels.

15. The apparatus as in claim 12, wherein the process when executed is further operable to:
receive a power restoration notification from the particular neighbor using one of the common channels.

16. The apparatus as in claim 12, wherein the process when executed is further operable to:
notify one or more of the neighbors of the apparatus as to when the apparatus is going to switch from the first channel hopping schedule to the second channel hopping schedule.

17. The apparatus as in claim 12, wherein the network event comprises receiving an instruction to switch channel hopping schedules.

18. The apparatus as in claim 12, wherein the apparatus further comprises a real time clock, and wherein the second channel hopping schedule is determined based in part on the real time clock.

19. The apparatus as in claim 18, wherein the second channel hopping schedule is determined based further in part on a deployment identifier.

20. The apparatus as in claim 12, wherein channels in the first channel hopping schedule are hopped more frequently than the common channels are hopped in the second channel hopping schedule.

21. The apparatus as in claim 12, wherein the process when executed is further operable to:
switch back to the first channel hopping schedule after the particular neighbor joins the network.

22. The apparatus as in claim 12, wherein the process when executed is further operable to:
receive a beacon request from a portable device via a channel of the first channel hopping schedule and on behalf of one of the one or more neighbors; and
provide a beacon using the first channel hopping schedule, in response to receiving the beacon request from the portable device.

23. A tangible, non-transitory, computer-readable media having software encoded thereon, the software when executed by a processor of a device configured to:
determine a first channel hopping schedule for the device to receive unicast communications from one or more neighbors of the device, wherein the first channel hopping schedule differs from channel hopping schedules used by the one or more neighbors to receive unicast communications;
determine a common second channel hopping schedule for the device for network discovery that includes channels that are common to the device and the one or more neighbors at every given point in time, wherein the second channel hopping schedule is based on parameters that are preconfigured across the device and the one or more neighbors prior to deployment, and wherein the same common second channel hopping schedule is self-generated by each of the device and the one or more neighbors based on the preconfigured parameters and without aid of a coordinating device;
switch from the first channel hopping schedule to the second channel hopping schedule, in response to a network event; and cause a particular neighbor to join the network using the second channel hopping schedule.

* * * * *